US 6,549,842 B1

(12) United States Patent
Hac et al.

(10) Patent No.: US 6,549,842 B1
(45) Date of Patent: Apr. 15, 2003

(54) METHOD AND APPARATUS FOR DETERMINING AN INDIVIDUAL WHEEL SURFACE COEFFICIENT OF ADHESION (75) Inventors: Aleksander Boguslaw Hac, Dayton, OH (US); Mark Olen Bodie, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/003,713

(22) Filed: Oct. 31, 2001

(51) Int. Cl.[7] .............................. G05D 1/00; B60T 7/12
(52) U.S. Cl. ............................. 701/80; 701/73; 701/90; 73/9; 303/149; 303/150
(58) Field of Search ............................. 701/80, 70, 73, 701/90; 180/197; 73/9, 105, 146; 303/140, 143, 149, 150, 189

(56) References Cited

U.S. PATENT DOCUMENTS

| 4,958,512 | A | * | 9/1990 | Johnsen | 73/9 |
|---|---|---|---|---|---|
| 5,357,798 | A | * | 10/1994 | Weinzerl et al. | 73/146 |
| 5,365,439 | A | * | 11/1994 | Momose et al. | 701/41 |
| 5,668,724 | A | * | 9/1997 | Ehret et al. | 701/80 |
| 5,747,682 | A | * | 5/1998 | Hirano | 73/118.1 |
| 5,944,392 | A | * | 8/1999 | Tachihata et al. | 303/112 |
| 6,163,747 | A | * | 12/2000 | Matsuno | 701/80 |
| 6,308,126 | B2 | * | 10/2001 | Yokoyama et al. | 701/70 |
| 2002/0072841 | A1 | * | 6/2002 | Kogure | 701/80 |

* cited by examiner

Primary Examiner—Jacques H. Louis-Jacques
(74) Attorney, Agent, or Firm—Robert M. Sigler (57) ABSTRACT The present invention provides a method of estimating a coefficient of adhesion between a road surface and a plurality of tires disposed on a vehicle. An estimated coefficient of adhesion for each of the plurality of tires is provided. First values of longitudinal and lateral forces on the tires are determined from a first set of vehicle dynamic parameters requiring no explicit knowledge of the coefficient of adhesion; and second values of the same forces are determined from a second set of vehicle parameters in an analytic tire model including the estimated value of the coefficient of adhesion. Differences between the first and the second values of the forces on the tires are determined in the longitudinal and lateral directions. Longitudinal and lateral adaptation speeds are determined for each of the plurality of tires; and a coefficient of adhesion adjustment for each of the plurality of tires is estimated from the differences and the adaptation speeds. The estimated coefficients of adhesion for each of the plurality of tires are updated with the estimated coefficient of adhesion adjustments in a reiterative process minimizing the differences.

35 Claims, 6 Drawing Sheets

METHOD AND APPARATUS FOR DETERMINING AN INDIVIDUAL WHEEL SURFACE COEFFICIENT OF ADHESION

TECHNICAL FIELD OF THE INVENTION

The present invention relates to surface coefficients of adhesion and, in particular, to a method and system for estimating the individual wheel surface coefficient of adhesion using tire forces.

BACKGROUND OF THE INVENTION

Many vehicles are equipped with a variety of electronically controlled chassis control systems, such as traction control systems, anti-lock braking systems, active brake control systems, active rear wheel steering systems, steer-by-wire systems, suspension control systems, etc. The purpose of these control systems is to improve vehicle performance, stability—in terms of acceleration, braking and handling—during demanding driving maneuvers performed close to or at the limit of the adhesion between the individual tires of the vehicle and the road surface. During such maneuvers, tire forces and resulting vehicle dynamic behavior are strongly influenced by the coefficient of adhesion between the individual tires of the vehicle and the road surface. In order to achieve satisfactory performance while driving under almost all road conditions, the control algorithms for the chassis control systems should be able to adapt to changing road surface conditions. Similarly, estimations of tire forces in both the longitudinal and lateral directions could help improve the overall performance of these subsystems. Present algorithms drawn to the estimation of the surface coefficient of adhesion are limited to an average surface coefficient for the entire vehicle. It would be desirable to have an algorithm for estimating the coefficient of adhesion between the road surface and individual tires disposed on a vehicle.

SUMMARY OF THE INVENTION

This invention is a method and apparatus for estimating the coefficients of adhesion between the road surface and each tire of a vehicle, as well as tire forces in the longitudinal and lateral directions. The method relies on information about the vehicle and wheel dynamics derived from, for example, steering wheel angle sensor(s), lateral acceleration sensor, yaw rate sensor, wheel speed sensors, and/or estimates of brake torque and driving torque applied to the vehicle wheels, which can be obtained from the brake and powertrain controllers, respectively. The method derives tire longitudinal and lateral forces estimated in two ways: one which depends on the sensor information and vehicle parameters but does not use the surface coefficient of adhesion, and the other depending on the estimated surface coefficients of adhesion. In one aspect of the invention, the estimated surface coefficients of adhesion are reiteratively adjusted, so that the differences between the tire forces calculated by each method are minimized. In another aspect of the invention, the adjustments to the estimated surface coefficients of friction are made according to a speed of adaptation that is determined at least partly in accordance with a determined vehicle handling state.

In a preferred embodiment, tire longitudinal forces are estimated from the wheel dynamics by using measured wheel speeds, brake torque, driving torque, and information about wheel inertia. The tire lateral forces per axle are preferably estimated from vehicle lateral dynamics, using measured yaw rate and lateral acceleration, as well as known vehicle parameters. To perform these calculations, no knowledge of surface conditions is necessary. At the same time, tire longitudinal and lateral forces are preferably calculated using an analytical tire model. The tire model yields longitudinal and lateral tire forces for each tire, which explicitly depend on the estimated surface coefficients of adhesion, but also on the estimated tire normal forces, wheel longitudinal slips, and wheel slip angles. The tire normal forces are preferably estimated using known vehicle parameters, measured lateral acceleration, and estimated longitudinal acceleration, by taking into account the effects of load transfers due to braking/accelerating and cornering. The vehicle and tire slip angles may be estimated simultaneously with the tire forces, using a closed loop dynamic observer. The observer is a model of vehicle dynamics in lateral direction with additional feedback of relevant measured signals. By monitoring the difference between the tire forces calculated from the tire model and estimated from vehicle and wheel dynamics, the algorithm recognizes situations when any of the vehicle tires operates close to the limit of adhesion and adjusts the estimated surface coefficient of adhesion for this tire so as to bring the calculated tire forces closer to the estimated forces.

The method for estimating the surface coefficients of adhesion for individual wheels is a version of a parameter identification algorithm, in which the estimates are adjusted at each iteration, so that they track (adapt to) the changes in the actual surface coefficients. Good tracking performance requires quick adjustments of the estimates, which may result in sensitivity to measurement noise. In order to provide a good balance between the speed of response (tracking performance) and immunity to noise, the speed of adaptation of surface estimation for each wheel is adjusted depending on particular operational conditions of this wheel and the vehicle. Preferably, the speed of adaptation is close to zero when the tire forces (in both longitudinal and lateral direction) remain within the linear range of tire behavior: that is, when the tire forces estimated (from wheel and vehicle dynamics) and calculated from linear and nonlinear tire models are in substantial agreement. The speed of adaptation preferably increases as the errors between the forces calculated from the tire models and the forces estimated (from vehicle and wheel dynamics) increase. In addition, the speed of adaptation preferably varies depending on whether the vehicle is in a steady state or in a quick transient.

As compared to prior art algorithms for estimation of surface coefficients, the proposed algorithm has the following advantages. It facilitates calculation of estimates of surface coefficients for each individual tire, rather than an average value for all four tires. The algorithm permits detection of surface coefficient in a wider range of operating conditions, including braking, accelerating, cornering and any combination thereof. It also permits detection of special situations, such as split mu conditions, in which different tires have significantly different coefficients. In addition, the algorithm provides estimates of all tire forces and tire and vehicle slip angles. All these estimated variables can be used to improve control of active brake, active steering systems, or electronically controlled suspensions, thus improving overall vehicle performance.

BRIEF DESCRIPTION OF THE DRAWINGS

The present invention will now be described by way of example with reference to the following drawings, in which.

DESCRIPTION OF THE PREFERRED EMBODIMENT

Figure 1:
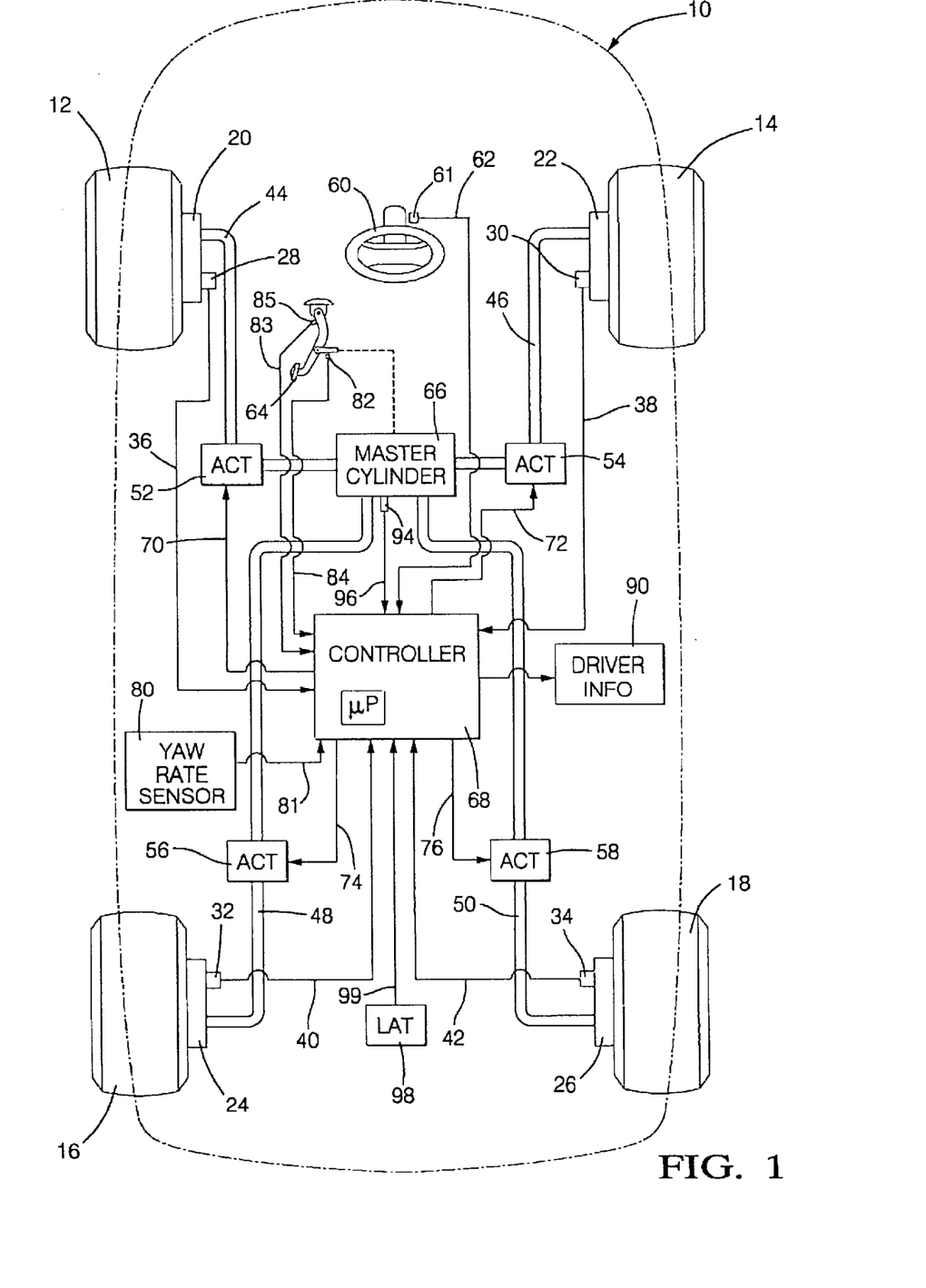
FIG. 1 is a schematic diagram of a vehicle brake control system, made in accordance with the present invention.

FIG. 1 shows a schematic diagram of a vehicle brake system, in accordance with the present invention. Referring to FIG. 1, vehicle 10 shown includes a controllable brake system with a controller 68 for controlling brakes 20, 22, 24 and 26 associated with vehicle wheels 12, 14, 16, 18. Various inputs to controller 68 may include wheel speed signals on lines 36, 38, 40, 42 from wheel speed sensors 28, 30, 32, 34, respectively, a brake pedal switch signal on line 84 from a brake pedal switch 82, a brake pedal extended travel signal on line 83 from a pedal travel sensor 85, a steering angle signal on line 62 from steering angle sensor 61, which indicates the steering angle controlled by steering wheel 60, a yaw rate signal on line 81 from yaw rate sensor 80, a master cylinder pressure signal on line 96 from master cylinder pressure sensor 94 associated with brake master cylinder 66, a lateral acceleration signal on line 99 from lateral accelerometer 98, and a rear wheel steer angle signal from a rear wheel angle sensor (not shown) or a rear steer actuator command. Alternatively, the rear wheel steer angle signal may be determined as a known function of the signal on line 62, if a four-wheel steering system is implemented on vehicle 10.

Each of sensors 28, 30, 32, 34, 61, 80, 82, 85, 98 may be implemented in a manner known to those skilled in the art. Brake pedal travel sensor 85 may include a switch mounted to the pedal that may provide, for example, an output signal when the pedal has been depressed an extended amount, which indicates "hard" braking by the driver.

In one embodiment, steering angle sensor 61 may include a digital sensor that provides output signals to increment a digital position signal within controller 68 with each degree or partial degree of movement of steering wheel 60 in one direction. The digital sensor may also provide output signals to decrement the digital position signal with each degree or partial degree of movement in the opposite direction. Steering wheel position sensor 61 may also include an analog sensor position output (i.e., from a rotary resistive device of a known type) that can provide approximate steering wheel position information. The analog output may be used, for example, to determine whether the steering wheel is turned less than a preset limit, i.e., 90 degrees, at vehicle start-up. A method for determining a center position of steering wheel position sensor 61 is disclosed in U.S. Pat. No. 5,857,160, the disclosure of which is hereby incorporated, in its entirety, by reference.

Responsive to the various inputs, controller 68 controls the braking of each wheel 12, 14, 16, 18 in anti-lock braking mode during certain braking maneuvers and in traction control mode during certain vehicle acceleration maneuvers to maintain the tractive force of the drive wheels on the road surface. The anti-lock brake control and positive acceleration traction control are performed in a known manner, except as modified herein.

Controller 68 also actively controls wheel brakes 20, 22 (in a two-channel system) or 20, 22, 24, 26 (in a four-channel system). Preferably, this control may be responsive to the actual vehicle yaw rate and actual vehicle lateral acceleration, as measured by sensors 80, 98, respectively. The purpose of this control is to minimize the difference between the actual vehicle yaw rate and a desired vehicle yaw rate and to minimize the difference between the actual vehicle slip angle and the desired vehicle slip angle. Because the base braking, the anti-lock braking and the traction control functions are known to those skilled in the art, only a general description thereof will be set forth herein.

When vehicle 10 is in a braking maneuver, controller 68 monitors the wheel speed signals from wheel speed sensors 28, 30, 32, 34 and determines if one or more of wheels 12, 14, 16, 18 is in or is about to be in an incipient lock-up condition. In this case, the anti-lock brake control mode for one or more of the wheels 12, 14, 16, 18 is activated. In the anti-lock brake control mode, controller 68 determines and outputs commands to the actuators 52, 54, 56, 58 corresponding to wheels 12, 14, 16, 18 in anti-lock brake mode to modulate the brake force applied to the wheels. Through control of actuators 52, 54, 56, 58, the controller prevents wheels 12, 14, 16, 18 from entering a lock-up condition while achieving effective brake control and steer-ability in a manner known to those skilled in the art of anti-lock brake control.

When vehicle 10 is not in a braking maneuver, but rather is accelerating due to output motive force from the vehicle's prime mover, i.e., the internal combustion engine or electric motor, controller 68 monitors the wheel speeds sensed by the wheel speed sensors to determine if the wheels intended to transfer motive force to the road surface are slipping or are about to slip. In such wheel slip conditions, controller 68 sends commands to actuators 52, 54, 56, 58, corresponding to wheels 12, 14, 16, 18 that are slipping or are about to slip, to provide brake force to the wheels to reduce slip. Such control is typically performed in conjunction with a parallel control in the engine or motor (and/or the transmission) controller to temporarily reduce the motive force output until wheel-to-road traction is reestablished.

In one embodiment, brake actuators 52, 54, 56, 58 are implemented as reciprocating piston actuators of a type known to those skilled in the art. Such actuators 52, 54, 56, 58 typically include a direct current (DC) motor which controls the position of a reciprocating piston through a rotary-to-linear motion converter to increase and/or decrease the hydraulic pressure in the brakes. In another embodiment, brake actuators 52, 54, 56, 58 are implemented as solenoid valves for selectively coupling the brakes to a source of pressurized hydraulic fluid to increase brake pressure. Additionally, in this embodiment, the solenoid valves are used for selectively coupling brakes 20, 22, 24, 26 to a brake fluid reservoir to decrease brake pressure. Implementation of such solenoid valves is known to those skilled in the art. In yet another example, rear brakes 24, 26 and/or front brakes 20, 22 may be electric motor-driven brakes, in which case the actuator and brake functions are performed by the same unit.

The example system described herein performs an active brake control of two wheel brakes 20, 22 or of four wheel brakes 20, 22, 24, 26 responsive to the steering wheel angle signal on line 62, the yaw rate signal on line 81, the vehicle speed as calculated responsive to the signals from the four wheel speed sensors 28, 30, 32, 34, the lateral acceleration signal on line 99 and either the brake pedal extended travel sensor 85 or the master cylinder pressure sensor 94. Using these signals, controller 68 then determines a desired vehicle yaw rate and compares that desired yaw rate to the actual yaw rate sensed by the yaw rate sensor 80. Controller 68 also determines a desired vehicle slip angle and compares it to the actual vehicle slip angle as determined by an estimator observer in the controller. If the yaw rate of vehicle 10 differs from the desired yaw rate by more than a dynamically-determined yaw rate threshold, controller 68 then determines and outputs commands to actuators 52, 54, 56, 58 to control vehicle wheel brakes 20, 22, 24, 26. This may also occur if a desired corrective yaw moment (determined responsive to yaw rate error and slip angle error) is greater than a yaw moment threshold. The purpose of the control is to bring the vehicle yaw rate and slip angle into conformance with the desired yaw rate and slip angle. In a two-channel system, only the front brakes 20, 22 are controlled, via actuators 52, 54, respectively.

In carrying out these tasks, controller 68 typically includes a microprocessor, ROM, RAM and appropriate input and output circuits of a known type for receiving the various input signals and for outputting the various control commands to actuators 52, 54, 56, 58.

Figure 2:
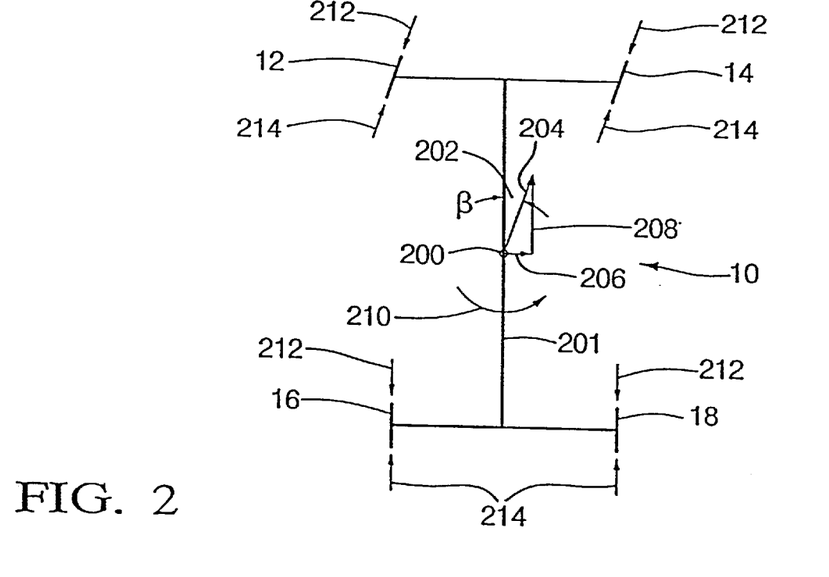
FIG. 2 illustrates a graphical representation of vehicle dynamics, made in accordance with the present invention.

Referring to FIG. 2, a schematic diagram illustrating the concepts of slip angle and yaw rate control is provided. Vehicle 10 has a longitudinal axis 201 oriented in what is commonly referred to as the x-direction or the forward direction of the vehicle. The vector denoted by reference 204 illustrates an example of a true velocity of the vehicle's center of gravity, which has a direction oriented at an angle β, denoted by reference 202, from the x-axis or longitudinal axis 201 of the vehicle. The vector 204 has longitudinal (x-axis) velocity component 208 and lateral velocity component 206, which is parallel to what is referred to herein as the y-axis. Reference 200 represents the vehicle's center of gravity.

During vehicle maneuvering operations, there are generally two kinds of vehicle behavior. The first is linear behavior, during which the vehicle's yaw rate and slip angle have fixed relationships to the steering wheel angle and the vehicle's forward velocity. Significant lateral movement of at least some of the vehicle's tires with respect to the road surface characterizes a nonlinear operation of the vehicle. During nonlinear operation, the vehicle's yaw rate 210 and slip angle 202 deviate from the fixed relationships to steering wheel angle and vehicle forward velocity that are characteristic of linear operation.

The present invention estimates the coefficient of adhesion between the road surface and the individual tires of vehicle 10, as well as the tire forces in both the longitudinal and lateral directions during vehicle operation. The present invention relies on information about vehicle 10 and wheel dynamics. This information is derived from steering angle sensor 61, lateral acceleration sensor 98, yaw rate sensor 80, wheel speed sensors 28, 30, 32, 34 and estimates of brake torque and driving torque as applied to wheels 12, 14, 16, 18. The above-noted torques may be obtained from brakes 20, 22, 24, 26 and the powertrain controllers. The fundamental principle of the present invention is based on the observation that tire longitudinal and lateral forces may be estimated in one of two ways. The first way depends primarily on information obtained from the above-listed sensors, as well as other vehicle parameters. The second way depends on the estimated surface coefficients of adhesion for each individual tire 12, 14, 16, 18. In the second method, the estimated surface coefficients of adhesion are then adjusted accordingly, so that the differences between the tire forces calculated from the above ways are minimized.

More specifically, tire longitudinal forces are estimated from the wheel dynamics based on the individual wheel speeds, the brake torque, the powertrain torque and the known rotary inertia of the wheels 12, 14, 16, 18. The per axle tire lateral forces are estimated from lateral vehicle dynamics, through the use of a measured yaw rate and lateral acceleration, as well as through known vehicle parameters. To perform these calculations, it is not necessary for the present invention to have a prior knowledge of road surface conditions. At the same time, the longitudinal and lateral tire forces may be calculated using an analytical tire model. This tire model yields longitudinal and lateral tire forces for each individual tire, which explicitly depend on the estimated surface coefficients of adhesion, as well as the estimated tire normal forces, the wheel longitudinal slips and the wheel slip angles. The tire normal forces are estimated using known vehicle parameters, measured lateral acceleration and estimated longitudinal acceleration, and take into account the effects of load transfer due to braking, accelerating and cornering. The vehicle and tire slip angles are estimated simultaneously with the tire forces, using a closed-loop dynamic observer. The closed-loop dynamic observer is a model of vehicle dynamics in the lateral direction with the additional feedback of relevant measured signals. By monitoring the difference between tire forces calculated from the tire model and those estimated from the vehicle and wheel dynamics, the present invention recognizes situations when any one of the vehicle tires operates close to the limit of adhesion. The present invention then adjusts the estimated surface coefficient of adhesion for that particular tire so as to bring the calculated tire forces closer to the estimated forces.

The speed of adaptation for the estimation of an individual tire's surface coefficient of adhesion depends on the particular operation conditions of that wheel and the vehicle 10. Generally, the speed of adaptation is close to zero when the tire forces (both longitudinal and lateral) remain within the linear range of tire behavior (that is, when the tire forces estimated from wheel and vehicle dynamics and the tire forces calculated from linear and nonlinear tire models are substantially equal). The speed of adaptation increases as the errors between the tire forces calculated from the tire models and the tire forces estimated from vehicle and wheel dynamics increase. In addition, the speed of adaptation varies depending on whether the vehicle 10 is in a steady state or in a quick transient state.

Compared with current methods of estimating surface coefficients, an embodiment of the present invention facilitates the calculation of estimates of surface coefficients of adhesion for each individual tire, rather than an average coefficient for all tires. Additionally, an embodiment of the present invention permits detection of the surface coefficient of adhesion in many situations, including, for example, braking, accelerating and/or cornering. Another embodiment of the present invention also permits detection of special situations, such as split g conditions. Finally, an embodiment of the present invention provides estimates of all tire forces and tire and vehicle slip angles. These estimated variables may be used, for example, to improve the control of the active brake systems, steering systems or electronically controlled suspension systems, thus improving overall vehicle performance.

During normal driving, which does not involve rapid changes in vehicle speed or direction, the vehicle's tires 12, 14, 16, 18 remain in the linear range of operation. During these conditions, the tire forces depend mainly on the elastic properties of the tires. Consequently, vehicle dynamic behavior, measured by the above-listed sensors, does not significantly depend on the surface conditions, so the surface coefficient of adhesion cannot be reliably inferred from the measured signals (as any changes in vehicle dynamic behavior caused by surface changes remain within the normally acceptable sensor errors). During handling maneuvers involving acceleration, deceleration or cornering performed close to or at the limit of adhesion, the magnitudes of the tire lateral and longitudinal forces may deviate significantly from those predicted by the linear tire models. Additionally, these forces depend upon the surface coefficient of adhesion. As a result, the dynamic behavior (in the yaw plane) of both the vehicle 10 and the wheels 12, 14, 16, 18 depend upon the surface coefficient of adhesion. Since the vehicle's dynamic response is measured, and can be predicted using driver inputs when the surface coefficient of adhesion is assumed known, it is possible to adjust the estimated surface coefficients to make the predicted response consistent with the observed response.

One of the fundamental observations used in the present invention is that the tire forces can be calculated in two distinct ways. That is, by using the measured and estimated signals, as well as known vehicle parameters, the tire forces can be determined in one of two ways. First, the tire longitudinal forces can be estimated from the rotary dynamics of the wheel, and the lateral tire forces per axle can be estimated from lateral dynamics of the vehicle 10. These calculations do not require knowledge of the surface coefficient of adhesion, but rather use the directly measured signals and estimates from vehicle subsystems, as well as known vehicle parameters. On the other hand, tire longitudinal and lateral forces may also be calculated from an analytical tire model, which explicitly depends on the surface coefficient of adhesion. By continuously comparing the estimated tire forces (from the wheel and vehicle dynamics) with the corresponding calculated forces from the tire model, the individual wheel surface coefficients of adhesion are adjusted to bring the calculated tire forces close to the estimated forces. If the magnitudes of estimated forces are significantly lower than those of the corresponding calculated forces, the surface coefficient of adhesion should be reduced by some amount. This will bring the calculated tire forces closer to the forces estimated from the vehicle and wheel dynamics.

Figure 3:
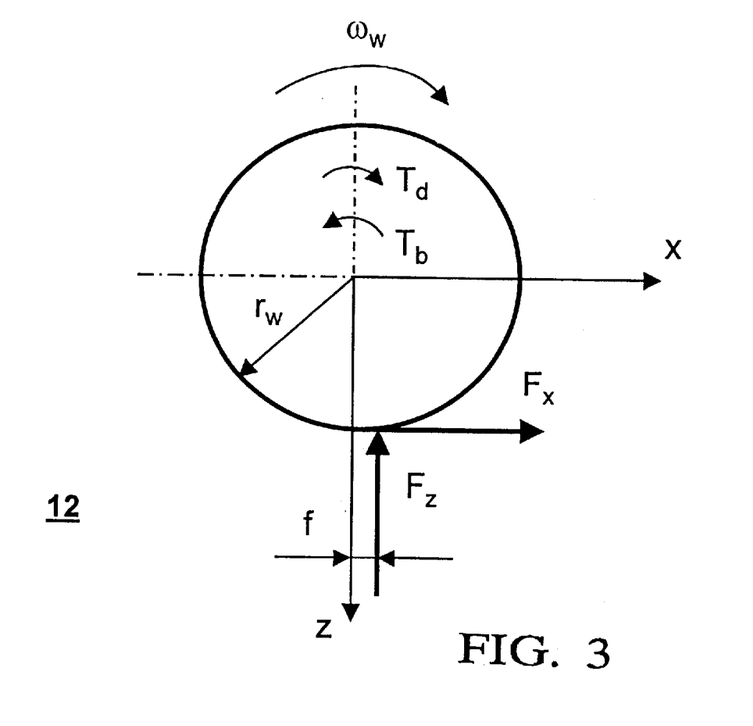
FIG. 3 is a schematic diagram showing a representation of the forces and moments acting on an individual wheel.

In order to illustrate the basic principle of adaptation, consider a single wheel 12 of vehicle 10 that is subject to braking or driving forces, but no lateral forces. The forces and moments acting upon this wheel 12 are illustrated in FIG. 3. Summing the moments about the wheel's axis of rotation yields the following formula:

$$I_w*(d\omega_w/dt)=T_d-T_b-f*F_z-r_w*F_x, \quad (1)$$

where $I_w$ is the wheel moment of inertia about the axis of rotation, $\omega_w$ is the rotational wheel speed, $T_d$ is the driving torque, $T_b$ denotes the braking torque, $f*F_z$ is the rolling resisting moment, $r_w$ is the dynamic radius of the tire 12 and $F_x$ is the tire longitudinal force. All variables on the right hand side of Equation ("Eq.") 1, with the exception of tire longitudinal force $F_x$ are measured or estimated. Solving for the unknown tire force yields the following estimated tire force:

$$F_{xe}=[T_d-T_b-f*F_z-I_w*(d\omega_w/dt)]/r_w. \quad (2)$$

On the other hand, the tire longitudinal force can be computed from the tire model as a function of the estimated surface coefficient of adhesion $\mu$, the tire normal force $F_z$, the tire longitudinal slip $s_x$ and the tire side slip angle $\alpha$. Thus, the longitudinal tire force computed from the tire model is:

$$F_{xcalc}=F_x(\mu, F_z, s_x, \alpha). \quad (3)$$

The difference between the estimated longitudinal force $F_{xe}$ and the calculated force $F_{xcalc}$ is an error e:

$$e=F_{xe}-F_{xcalc}, \quad (4)$$

We want to minimize the error e: that is, to make the tire force $F_{xcalc}$ calculated from the tire model match the tire force $F_{xe}$ estimated from wheel dynamics equation, by properly adjusting the estimated surface coefficients of adhesion. This can be done by using the following parameter adaptation law:

$$\mu(i+1)=\mu(i)-\gamma*e*(\partial e/\partial \mu), \quad (5)$$

where $\gamma$ is a positive constant that determines the rate of adaptation, $\partial e/\partial \mu$ is the sensitivity derivative (that is, the partial derivative of the error with respect to the surface coefficient of adhesion $\mu$), and index i refers to the discrete sampling time. Note that $2*e*\partial e/\partial \mu = \partial e^2/\partial \mu$: that is, by applying the adaptation law (Eq. 5), we try to minimize the square $e^2$ of the error by adjusting the parameter $\mu$ in the direction of the negative gradient of the error. Substituting the error e from Eq. 4, Eq. 5 may be written in the following form:

$$\mu(i+1)=\mu(i)+\gamma*(F_{xe}-F_{xcalc})*(\partial F_{xcalc}/\partial \mu) \quad (6)$$

In the above equation, we used the fact that the tire force $F_{xcalc}$ calculated from the tire model depends explicitly on the surface coefficient of adhesion $\mu$.

Figure 4:
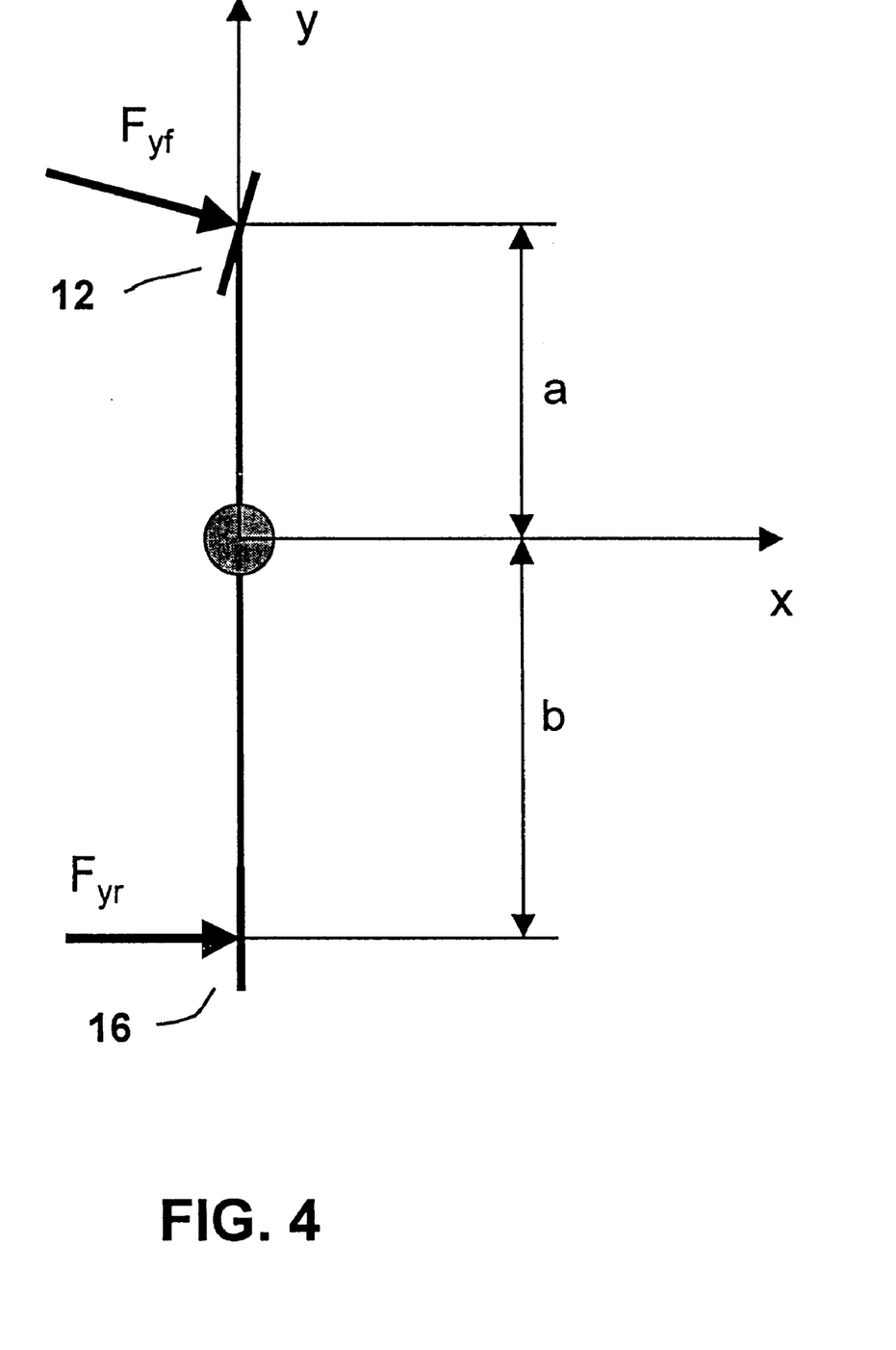
FIG. 4 is a schematic diagram showing a preferred embodiment, made in accordance with the present invention, of a simplified vehicle model in the yaw plane.

In the preceding discussion, the principle of adaptation was illustrated using only longitudinal tire forces on a wheel. However, changes in the surface coefficient of adhesion may also be detected if the tires generate significant lateral forces, usually as a result of a cornering maneuver. In this case, tire lateral forces per axle can be calculated from the simplified equations describing vehicle lateral dynamics. A simplified vehicle model in the yaw plane, also known as a bicycle model, is illustrated in FIG. 4. Assuming that the steering angles of both the front and rear axles are small and that there is no significant imbalance in tire longitudinal forces between the left and right sides of the vehicle, the equations of motion are as follows:

$$M*a_y=F_{yf}+F_{yr} \quad (7a)$$

$$I_{zz}*(d\Omega/dt)=a*F_{yf}-b*F_{yr}. \quad (7b)$$

In the above equations, M denotes total vehicle mass, $I_{zz}$ indicates the moment of inertia about the yaw (vertical) axis, $a_y$ is the lateral acceleration, $\Omega$ is the vehicle yaw rate, a and b are the distances between the vehicle's center of gravity and front and rear axles, respectively, and $F_{yf}$ and $F_{yr}$ are the lateral forces for the front and rear axles, respectively. In the vehicle parameters in Eqs. 7a and 7b, M, $I_{zz}$, a and b are approximately known, while the lateral acceleration, $a_y$, and yaw rate, Ω, are directly measured. Thus, the estimates of the lateral tire forces per axle can be obtained by solving Eqs. 7a and 7b for the lateral forces. This yields:

$$F_{yfe}=(M*b*a_y+I_{zz}*d\Omega/dt)/(a+b) \quad (8a)$$

$$F_{yre}=(M*a*a_y-I_{zz}*d\Omega/dt)/(a+b). \quad (8b)$$

At the same time, the lateral forces per axle can be computed as sums of tire lateral forces calculated from the tire model. That is:

$$F_{yfcalc}=F_{y1}(\mu_1, F_{z1}, s_{x1}, \alpha_1)+F_{y2}(\mu_2, F_{z2}, s_{x2}, \alpha_2) \quad (9a)$$

$$F_{yrcalc}=F_{y3}(\mu_3, F_{z3}, s_{x3}, \alpha_3)+F_{y4}(\mu_4, F_{z4}, s_{x4}, \alpha_4) \quad (9a)$$

Here, subscript 1 refers to the left front tire 12, 2 to the right front tire 14, 3 indicates the left rear tire 16, and 4 denotes the right rear tire 18. Furthermore, it can be observed that only the tire forces calculated from the tire model depend on the surface coefficients of adhesion for each individual tire.

The process of updating the surface coefficient of friction based on lateral forces is similar to that described for longitudinal forces. Let e denote the difference between the estimated lateral force $F_{yfe}$, for the front axle and the corresponding force $F_{yfcalc}$ calculated from the tire model. Thus:

$$e=F_{yfe}-F_{yfcalc}. \quad (10)$$

If a meaningful discrepancy between the estimated and calculated forces is observed, the estimated surface coefficient of adhesion for each tire can be adaptively adjusted as follows:

$$\mu_j(i+1)=\mu_j(i)-\gamma*e*(\partial e/\partial \mu_j), \quad (11)$$

where the index j=1, 2 refers to front left tire 12 or front right tire 14, respectively. Eq. 11 can be written more explicitly as follows:

$$\mu_j(i+1)=\mu_j(i)+\gamma*(F_{yfe}-F_{yfcalc})*(\partial F_{yfcalc}/\partial \mu_j). \quad (12)$$

Note that, according to Eq. 9a, $\partial F_{yfcalc}/\partial \mu_1 = \partial F_{y1}/\partial \mu_1$ and $\partial F_{yfcalc}/\partial \mu_2 = \partial F_{y2}/\partial \mu_2$.

The difference between calculating the tire to road surface coefficient from the wheel and vehicle dynamics may be explained as follows. In the first case, the estimated forces can be calculated independently for each tire, while only forces per axle, which are the sums of lateral forces for both tires of each axle, can be inferred from vehicle dynamics. Comparing Eq. 12 with Eq. 6, it is seen that in Eq. 6 both the error and the error gradient are calculated for each wheel, while in Eq. 12 the error is calculated for axle forces and only the error gradient is individually computed for each tire. It can therefore be expected that split μ conditions (that is, different coefficients for right and left tires) may be difficult to detect during cornering maneuvers in which tire longitudinal forces are small.

The adaptive control laws (Eqs. 6 and Eqs. 12) obtained for individual components of tire forces can be generalized to a vector (multidimensional) case. In general, it is desirable to be able to adjust the surface coefficient of adhesion for each individual tire when a significant difference between the estimated and calculated tire force in either longitudinal or lateral direction is observed. Since we are seeking four coefficients of adhesion (one for each tire), the surface coefficients can be described as a 4-dimensional column vector:

$$\mu=[\mu_1\ \mu_2\ \mu_3\ \mu_4]^T, \quad (13)$$

where T denotes the transposition of the vector. Since the lateral forces per axle, not per wheel, are estimated (from vehicle dynamics), the following 6-dimensional error vector can be defined:

$$e(\mu)=[e_1(\mu_1)e_2(\mu_2)e_3(\mu_3)e_4(\mu_4)e_5(\mu_5)e_6(\mu_3,\mu_4)]^T. \quad (14)$$

Here, $e_j(\mu_j)$ for j=1, 2, 3 ,4 represent the errors in the longitudinal forces for each individual tire, while $e_5(\mu_1, \mu_2)$ and $e_6(\mu_3, \mu_4)$ are errors in the lateral forces for the front and rear axles, respectively. These errors are given by:

$$e_j(\mu_j)=F_{xje}-F_{jcalc}(\mu_j), j=1,2,3,4 \quad (15a)$$

$$e_5(\mu_1,\mu_2)=F_{yfe}-[F_{y1calc}(\mu_1)+F_{y2calc}(\mu_2)] \quad (15b)$$

$$e_6(\mu_3,\mu_4)=F_{yre}-[F_{y3calc}(\mu_1)+F_{y4}calc(\mu_2)] \quad (15c)$$

Note that in the expressions for the errors in the lateral forces, $e_5$ and $e_6$, only the estimated lateral forces per axle are available, while the calculated forces are computed for all four wheels 12, 14, 16, 18. Using the vector notation introduced above, the parameter adaptation law for the vector of the surface coefficients of adhesion under all four wheels 12, 14, 16, 18 is given by:

$$\mu(i+1)=\mu(i)-\gamma*e^{T}*(\partial e/\partial \mu), \quad (16)$$

where $\partial e/\partial \mu$ is the gradient of the error vector e with respect to the vector of the surface coefficients of adhesion μ. In this case, the gradient is a 6 by 4 matrix with the elements defined as follows:

$$[(\partial e/\partial \mu)]_{kj}=\partial e_k/\partial \mu_j, \quad (17)$$

where j=1, 2, 3, 4 and k=1, 2, 3, 4, 5, 6. By substituting Eqs. 15 into Eqs. 17, the following matrix is obtained for the gradient of the error vector:

$$\partial e/\partial \mu = \quad (18)$$

$$\begin{pmatrix} -\partial F_{x1calc}/\partial \mu_1 & 0 & 0 & 0 \\ 0 & -\partial F_{x2calc}/\partial \mu_2 & 0 & 0 \\ 0 & 0 & -\partial F_{x3calc}/\partial \mu_3 & 0 \\ 0 & 0 & 0 & -\partial F_{x4calc}/\partial \mu_4 \\ -\partial F_{y1calc}/\partial \mu_1 & -\partial F_{y2calc}/\partial \mu_2 & 0 & 0 \\ 0 & 0 & -\partial F_{y3calc}/\partial \mu_3 & -\partial F_{y4calc}/\partial \mu_4 \end{pmatrix}$$

Matrix 18 has most entries equal to zero, reflecting the fact that the tire forces for a given wheel depend explicitly only on the surface coefficient of adhesion under that particular wheel, but do not depend on the surface coefficients of adhesion under the other wheels. Taking this into account, Eq. 16 is expressed in terms of the scalar components as follows:

$$\mu_1(i+1)=\mu_1(i)-\gamma*[e_1*(\partial e_1/\partial \mu_1)+e_5*(\partial e_5/\partial \mu_1)] \quad (19a)$$

$$\mu_2(i+1)=\mu_2(i)-\gamma*[e_2*(\partial e_2/\partial \mu_2)+e_5*(\partial e_5/\partial \mu_2)] \quad (19b)$$

$$\mu_3(i+1)=\mu_3(i)-\gamma*[e_3*(\partial e_3/\partial \mu_3)+e_6*(\partial e_6/\partial \mu_3)] \quad (19c)$$

$$\mu_4(i+1)=\mu_4(i)-\gamma*[e_4*(\partial e_4/\partial \mu_4)+e_6*(\partial e_6/\partial \mu_4)] \quad (19a)$$

Using Eqs. 15 for the error terms, Eqs. 19 can be written, more explicitly, in the following form:

$$\mu_1(i+1)=\mu_1(i)+\gamma*[(F_{x1e}-F_{x1calc})(\partial F_{x1calc}/\partial \mu_1)+(F_{yfe}-F_{y1calc}-F_{y2calc})*(\partial F_{y1calc}/\partial \mu_1)] \quad (20a)$$

$$\mu_2(i+1)=\mu_2(i)+\gamma*[(F_{x2e}-F_{x2calc})(\partial F_{x2calc}/\partial \mu_2)+(F_{yfe}-F_{y1calc}-$$

$$F_{y2calc})*(\partial F_{y2calc}/\partial \mu_2)] \tag{20b}$$

$$\mu_3(i+1)=\mu_3(i)+\gamma*[(F_{x3e}-F_{x3calc})(\partial F_{x3calc}/\partial \mu_3)+(F_{yfe}-F_{y3calc}-F_{y4calc})*(\partial F_{y3calc}/\partial \mu_3)] \tag{20c}$$

$$\mu_4(i+1)=\mu_4(i)+\gamma*[(F_{x4e}-F_{x4calc})(\partial F_{x4calc}/\partial \mu_4)+(F_{yfe}-F_{y3calc}-F_{y4calc})*(\partial F_{y4calc}/\partial \mu_4)] \tag{20d}$$

Eqs. 20 describe the prototype parameter adaptation laws for the individual wheel surface coefficients of adhesion. Furthermore, the equations use the differences between the tire and axle forces estimated from both wheel and vehicle dynamics and tire forces estimated by the tire model. The forces estimated by the tire model depend not only on the estimated surface coefficient of adhesion, but also on the tire normal forces, the tire longitudinal slips and the tire slip angles. All these variables must be estimated simultaneously. Any tire model can be used. If the tire model is not analytic; that is, if it does not allow for an explicit computation of the partial derivatives of forces with respect to the surface coefficient of adhesion, the partial derivatives can be replaced by the differences between the forces computed from the linear tire model and the forces computed from the nonlinear tire model.

The parameter γ is used to adjust the speed of adaptation. If γ is too small, the estimates will not track quick changes in the surface coefficients of adhesion. If γ is too large, the parameter adaptation scheme may become unstable, resulting in wide oscillations of the estimates. A compromise is therefore necessary. In order to obtain good performance in practice, the following changes are made to the basic adaptation law:

(1) The coefficient γ, which is used to adjust the speed of adaptation, is not constant, but changes with the operating conditions. For example, γ may be close to or equal zero when the differences between the estimated and calculated forces are within specified thresholds, since small differences are always expected as a result of sensor errors. The coefficient γ can also be different for terms involving lateral forces from those used for the longitudinal forces.

(2) Since during cornering maneuvers it is easier to detect surface changes for the front (steered) axle, the surface coefficients for rear tires 16, 18 are additionally adjusted using the surface coefficients of the front tires 12, 14. This is based on the assumption that each of the rear wheels 16, 18 traverses essentially the same path as the corresponding front wheel 12, 14 on the same side of the vehicle with a small time delay.

(3) The sensitivity functions (partial derivatives) of the calculated tire forces with respect to the surface coefficient of adhesion can be replaced by the (properly limited) differences between the tire forces calculated from a linear tire model and those calculated from the nonlinear tire model.

An example of one embodiment of the present invention is described below, in conjunction with the flow chart shown in FIG. 5. The sensor inputs are processed to reject noise and to compensate for unwanted contributions, as is typically done in vehicle stability enhancement systems. The sensor data includes four wheel speeds, steering angles (front only for conventional vehicles; front and rear, if rear wheels are also steered), a yaw rate from sensor 80 and a lateral acceleration from sensor 98. In addition, the estimates of the brake torques for each wheel and the driving torques for each wheel are available, as well as the estimate of vehicle longitudinal speed. These estimates are obtained from the brakes 20, 22, 24, 26 and powertrain controller.

Figure 5:
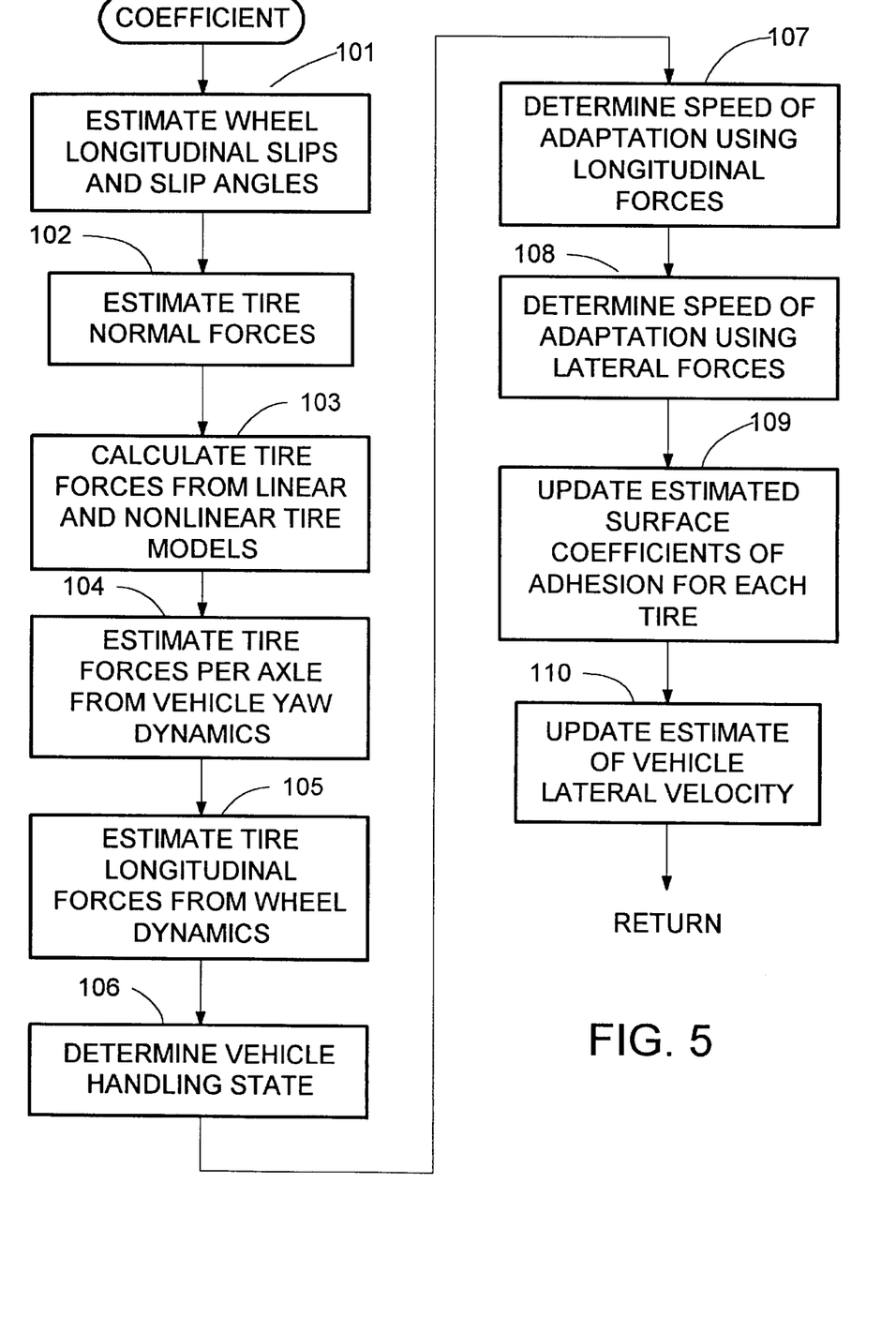
FIG. 5 is a flow chart showing a preferred embodiment of the method of the present invention.

The process described by the flow chart of FIG. 5 begins at Block 101 with the calculation of the longitudinal slip and the slip angle for each individual wheel. In addition to measured signals, Block 101 uses the estimate of vehicle lateral velocity from the previous iteration. The signals used by this Block are the measured yaw rate, Ω, the wheel speeds, $v_{wj}$, j=1, 2, 3, 4 the steer angle of the front wheels 12, 14, $\delta_f$, (or front, $\delta_f$, and rear, $\delta_r$, if rear wheels 16, 18 are steered), the estimated vehicle longitudinal speed, $v_x$, and the estimated vehicle lateral speed, $v_{ye}$. There presently exist methods for estimating wheel longitudinal slips. If reliable estimates are available from the brake controllers 20, 22, 24, 26, such estimates may be used. For completeness, a method for determining both the longitudinal and the lateral slips (slip angles) is presented below. This method uses measured signals, such as yaw rate and steering angles, ordinarily not available in standard brake control systems, and therefore may produce superior estimates of wheel slips.

First, vehicle longitudinal speed and wheel speeds are limited from below to very small values, in order to avoid division by 0. The magnitude of the estimate of vehicle lateral velocity is then limited in order to limit the estimated vehicle slip angle to a reasonable value. Thus, the limited lateral velocity is:

$$v_{yelim} = \begin{cases} v_{ye} & \text{if } |v_{ye}| < s_{ymax}*v_x \\ s_{ymax}*|v_x|*\text{sign}(v_{ye}) & \text{if } |v_{ye}| \geq s_{ymax}*v_x \end{cases} \tag{21}$$

In the above, $s_{ymax}$ is a constant parameter (preferably having a typical value of 0.3) which denotes the maximum realistically expected lateral slip of vehicle (i.e., a tangent of vehicle slip angle).

Figure 6:
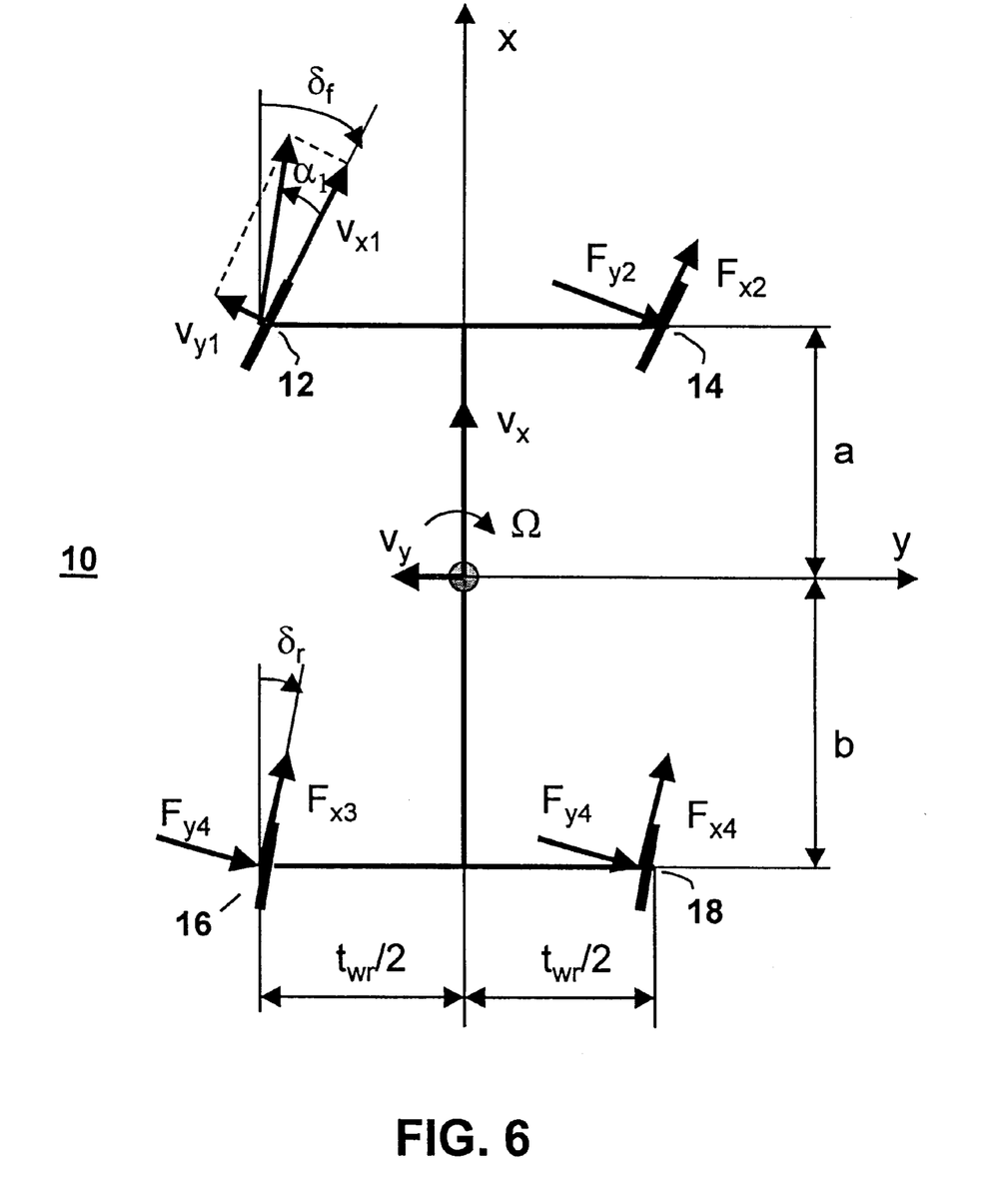
FIG. 6 is a schematic diagram showing a preferred embodiment, made in accordance with the present invention, of a model illustrating vehicle kinematics in the yaw plane.

Next, using the four-wheel vehicle model in the yaw plane, as shown in FIG. 6, the linear velocities of each vehicle wheel center, in the longitudinal direction of each wheel, are computed from the following kinematic expressions:

$$v_{x1}=(v_x+\Omega*t_{wf}/2)*\cos(\delta_f)+(v_{yelim}+a*\Omega)*\sin(\delta_f) \tag{22a}$$

$$v_{x2}=(v_x-\Omega*t_{wf}/2)*\cos(\delta_f)+(v_{yelim}+a*\Omega)*\sin(\delta_f) \tag{22b}$$

$$v_{x3}=(v_x+\Omega*t_{wr}/2)*\cos(\delta_r)+(v_{yelim}-b*\Omega)*\sin(\delta_r) \tag{22c}$$

$$v_{x4}=(v_x-\Omega*t_{wr}/2)*\cos(\delta_r)+(v_{yelim}-b*\Omega)*\sin(\delta_r). \tag{22d}$$

In the above equations, and for all subsequent equations, subscript 1 refers to the left front wheel 12, subscript 2 denotes the right front wheel 14, subscript 3 refers to the left rear wheel 16 and subscript 4 denotes right rear wheel 16. The parameters $t_{wf}$ and $t_{wr}$ denote front and rear track widths, respectively, and a and b represent the distances between the vehicle's center of mass to the front and rear axles, respectively.

The tire longitudinal slips, $s_{xj}$, j=1, 2, 3, 4 are then calculated as follows:

$$s_{xj} = \begin{cases} (v_{wj}-v_{xj})/v_{wj} & \text{if } v_{wj} > v_{xj} \\ (v_{wj}-v_{xj})/v_{wj} & \text{if } v_{wj} \leq v_{xj} \end{cases} \tag{23}$$

The variable, $v_{wj}$, is the measured wheel circumferential speeds (or, more precisely, the rotational wheel speed is measured, but the circumferential speed is obtained by multiplying the rotational speed by tire radius). Note that in order to calculate the wheel longitudinal slips, the differences between the measured wheel speeds, $v_{wj}$, and the velocities of wheel centers (in the longitudinal direction), $v_{xj}$, are divided by the larger of the two velocities, so that the calculated wheel slips remain within the interval [−1, 1].

Figure 7:
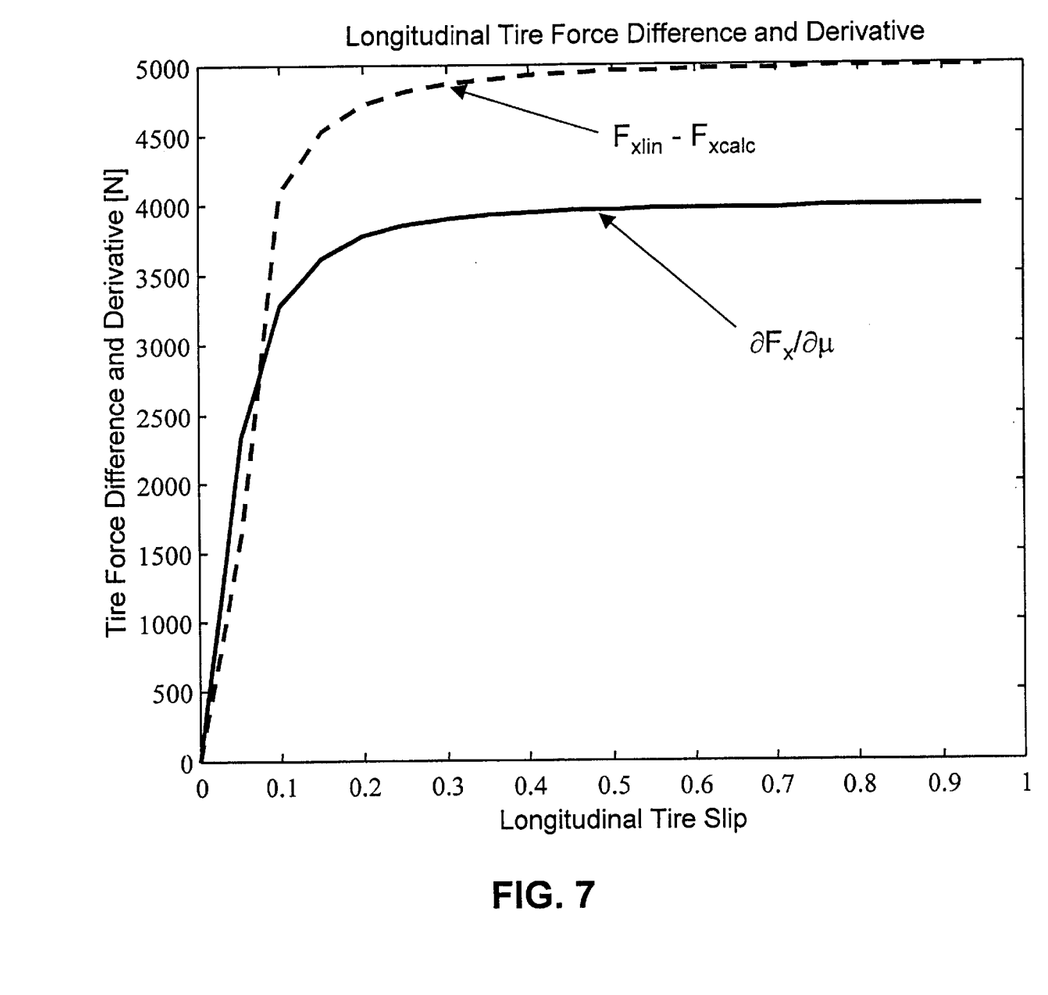
FIG. 7 is a graph showing a comparison of the partial derivative of the longitudinal tire force with respect to the surface coefficient of adhesion with the difference between the longitudinal forces calculated from both linear and nonlinear tire models for a constant slip angle of 6°.

The tire slip angles are calculated using the kinematic relationships easily derived from FIG. 7. Assuming that the tire slip angles, $\alpha_j$, j=1, 2, 3, 4 are small, they may be given by:

$$\alpha_1=(v_{ye}+a*\Omega)/(v_x+\Omega*t_{wf}/2)-\delta_f \qquad (24a)$$

$$\alpha_2=(v_{ye}+a*\Omega)/(v_x-\Omega*t_{wf}/2)-\delta_f \qquad (24b)$$

$$\alpha_3=(v_{ye}-b*\Omega)/(v_x+\Omega*t_{wr}/2)-\delta_r \qquad (24c)$$

$$\alpha_4=(v_{ye}-b*\Omega)/(v_x-\Omega*t_{wr}/2)-\delta_r. \qquad (24d)$$

In subsequent calculations, it is more convenient to use the tire lateral slips, $s_{yj}$, j=1, 2, 3, 4 instead of slip angles, which are defined as tangents of slip angles:

$$s_{yj}=\tan(\alpha_j). \qquad (25)$$

In Block 102, the estimates of tire normal forces are computed, which include the load transfer effects due to cornering, accelerating and braking. If the vehicle 10 is equipped with a controllable suspension, estimates of tire normal forces may be available from the suspension controller. Otherwise, the simplified method of estimating these forces, presented below, is recommended. Ignoring any variation in normal force, resulting from road induced vibrations of the vehicle 10, the normal forces for each tire 12, 14, 16, 18 can be calculated as a sum of the static load and the dynamic load transfers resulting from vehicle longitudinal and lateral accelerations. Vehicle lateral acceleration, $a_y$, is measured directly, while the longitudinal acceleration, $a_x$, can be estimated by passing the vehicle reference speed through a high-pass filter (i.e., a differentiator), preferably located integral with the controller 68. The longitudinal load transfer is approximately the same for the front and rear axles, but the lateral load transfer depends on the roll stiffness of the front and rear suspensions, which determine the distribution of roll moment between front and rear axle.

Denoting $k_{rollf}$ and $k_{rollr}$ as the fractions of total roll stiffness contributed by front and rear suspension, respectively. As a result, $k_{rollf}+k_{rollr}=1$. Thus, the tire normal forces may be calculated as follows:

$$F_{z1}=[M*(g*b-a_x*h)]/[2*(a+b)]+k_{rollf}*M*a_y*h/(2*t_{wf}) \qquad (26a)$$

$$F_{z2}=[M*(g*b-a_x*h)]/[2*(a+b)]-k_{rollf}*M*a_y*h/(2*t_{wf}) \qquad (26b)$$

$$F_{z3}=[M*(g*a+a_x*h)]/[2*(a+b)]+k_{rollr}*M*a_y*h/(2*t_{wr}) \qquad (26c)$$

$$F_{z4}=[M*(g*a+a_x*h)]/[2*(a+b)]-k_{rollr}*M*a_y*h/(2*t_{wr}). \qquad (26d)$$

Parameter M denotes the total mass of the vehicle 10, h is the height of vehicle's center of gravity above ground, and g is acceleration of gravity. It can be seen that the only signals used by this block are the measured lateral acceleration, $a_y$, and the estimated longitudinal acceleration, $a_x$, as well as vehicle parameters.

Using the information from Blocks 101 and 102, and the estimates of surface coefficients from the last iteration, tire longitudinal and lateral forces are calculated from linear and nonlinear tire models in Block 103. The difference between the tire forces calculated from the linear and nonlinear model are used to replace the partial derivatives in Eq. 20, above.

Tire forces are generally non-linear functions of the surface coefficient of adhesion, tire normal load, tire longitudinal slip, and tire slip angle (or lateral slip). In principle, any tire model that permits the calculations of tire longitudinal and lateral forces as functions of the four variables just listed can be used. The model described below, which is a modification of a Duggoff's tire model, is only one example.

In calculating the tire forces, the current estimates of the tire longitudinal and lateral slips, $s_x$ and $s_y$, and normal forces, $F_{zj}$, j=1, 2, 3, 4, as determined in Blocks 101 and 102, are used. However, since the current values of the surface coefficients of adhesion have yet to be determined, the values from previous iteration are used. It is assumed in the simplified tire model described here that the tire cornering stiffness and tire longitudinal stiffness are equal, but they vary with the normal load. This variation is described by the following quadratic function of normal load, $F_z$:

$$C=C_0*(F_z/F_{z0})*[1-k_1*(\Delta F_z/F_{z0})], \qquad (27)$$

where C is the tire stiffness (in lateral or longitudinal direction), $F_{z0}$ is the nominal tire normal load, $\Delta F_z=F_z-F_{z0}$ is the normal load deviation from the nominal value, and $k_1$ is the tire load sensitivity coefficient (which is typically about 0.6). In order to shorten the subsequent equations, the following notation is introduced:

$$s=(s_x^2+s_y^2)^{1/2} \qquad (28)$$

$$\text{index}=\mu*F_z/(2*C*s), \qquad (29)$$

where s denotes the resultant tire slip; that is, a vector sum of tire slips in both the longitudinal and lateral directions.

The tire longitudinal forces, calculated from the tire model, are:

$$F_{xj} = \begin{cases} C_j*s_{xj} & \text{when index}_j \geq 1 \\ (\mu_j*F_{zj}*s_{xj}/s)*(1-\text{index}_j/2) & \text{when index}_j < 1 \end{cases} \qquad (30)$$

where $C_j$ is the tire stiffness for j-th tire, calculated from Eq. 27. The tire lateral forces are given by:

$$F_{yj} = \begin{cases} -C_j*s_{yj} & \text{when index}_j \geq 1 \\ -(\mu_j*F_{zj}*s_{yj}/s)*(1-\text{index}_j/2) & \text{when index}_j < 1 \end{cases} \qquad (31)$$

The partial derivatives of tire forces with respect to the surface coefficients of adhesion, are obtained by differentiating Eqs. 30 and 31 bearing in mind that $\text{index}_j$ depends on the surface coefficient of adhesion. This yields:

$$\partial F_{xj}/\partial \mu_j = \begin{cases} 0 & \text{when index}_j \geq 1 \\ (F_{zj}*s_{xj}/s)*(1-\text{index}_j) & \text{when index}_j < 1 \end{cases} \qquad (32)$$

$$\partial F_{yj}/\partial \mu_j = \begin{cases} 0 & \text{when index} \geq 1 \\ -(F_{zj}*s_{yj}/s)*(1-\text{index}) & \text{when index} < 1 \end{cases} \qquad (33)$$

When the tire longitudinal and lateral slips are small, the tire longitudinal and lateral forces are linear functions of corresponding slips and do not depend on the surface coefficient of adhesion. Since for any tire, the tire forces depend only on the coefficient of adhesion for that particular tire only, the partial derivatives $\partial F_{xj}/\partial \mu_i=0$ and $\partial F_{yj}/\partial \mu_i=0$ for i≠j in both linear and nonlinear ranges of operation.

In practice, the derivatives of tire forces with respect to surface coefficients of adhesion can be replaced by the differences between the tire forces calculated from the linear model and saturated at the level of corresponding normal forces and the tire forces calculated from the nonlinear model. The limited tire forces from the linear model are given by:

$$F_{xjlin} = \begin{cases} C_j * s_{xj} & \text{when } |C_j * s_{xj}| < F_{zj} \\ F_{zj} * \text{sign}(s_{xj}) & \text{when } |C_j * s_{xj}| \geq F_{zj} \end{cases} \quad (34)$$

where $C_j$ is the tire stiffness for j-th tire calculated from Eq. 27. The tire lateral forces are given by:

$$F_{yjlin} = \begin{cases} -C_j * s_{yj} & \text{when } |C_j * s_{yj}| < F_{zj} \\ -F_{zj} * \text{sign}(s_{yj}) & \text{when } |C_j * s_{yj}| \geq F_{zj} \end{cases} \quad (35)$$

Note that the tire forces calculated from the "linear" model are limited from above using the values of normal loads, which approximately corresponds to the maximum forces achievable on a dry surface. They do not depend on the surface coefficients of adhesion.

The differences between the tire forces $F_{xjlin}$ computed from the linear model and $F_{xj}$ from the nonlinear model are plotted, along with the partial derivatives of the tire forces, with respect to the surface coefficient of adhesion in FIG. 7. Both variables are shown as functions of longitudinal slip and for a constant slip angle equal to 6°. It is seen that both curves are very similar.

In Block 104, the estimates of lateral forces per axle are calculated from a vehicle handling model. As explained earlier, lateral forces per axle can be calculated using equations of vehicle dynamics in the yaw plane. If a simplified bicycle model is used, the estimates of the front axle lateral force $F_{yfe}=F_{y1e}+F_{y2e}$ and the rear axle lateral force $F_{yre}=F_{y3e}+F_{y4e}$ may be computed from Eqs. 8, reprinted here:

$$F_{yfe}=(M*b*a_y+I_{zz}*d\Omega/dt)/(a+b) \quad (8a)$$

$$F_{yre}=(M*a*a_y-I_{zz}*d\Omega/dt)/(a+b). \quad (8b)$$

In the above equations, lateral acceleration ay is measured directly and yaw acceleration $d\Omega/dt$ is obtained by high pass filtering the measured yaw rate. The measured lateral acceleration used in Eqs. 8 is the lateral acceleration not compensated for the effect of bank angle of the road (since bank angle affects both measured lateral acceleration and tire forces in the same way). Vehicle parameters mass M, yaw moment of inertia $I_{zz}$, and the distances a and b are approximately known.

It should be noted that a more accurate expression might be developed for the lateral forces per axle if the estimates of longitudinal tire forces are used. This allows one to capture, for example, the effect of differential braking between the left and right side of the vehicle 10. Considering the vehicle model with four wheels, the following equations may be formulated:

$$M*a_y=F_{yf}*\cos \delta_f+F_{yr}+(F_{x1}+F_{x2})*\sin \delta_f \quad (36a)$$

$$I_{zz}*d\Omega/dt=F_{yf}*a*\cos \delta_f-F_{yr}*b+[(F_{x1}-F_{x2})\cos \delta_f+(F_{x3}-F_{x4})]*(t_w/2). \quad (36b)$$

In the above equations, the rear wheel steering angle was assumed to be zero. Taking the effect of rear wheel steering angle into account is a straightforward generalization of Eqs. 36. Solving these equations for the unknown lateral forces yields:

$$F_{yfe}=[M*b*a_y+I_{zz}*d\Omega/dt-(F_{x1calc}+F_{x2calc})*b*\sin \delta_f]/(a+b)[(F_{x1calc}-F_{x2calc})*\cos \delta_f+F_{x3calc}-F_{x4calc}]*(t_w/2)/(a+b) \quad (37a)$$

$$F_{yre}=[M*b*a_y-I_{zz}*d\Omega/dt-(F_{x1calc}+F_{x2calc})*a*\sin \delta_f]/(a+b)+[(F_{x1calc}-F_{x2calc})*\cos \delta_f+F_{x3calc}-F_{x4calc}]*(t_w/2)/(a+b) \quad (37b)$$

The preceding equations use the most recent values of tire longitudinal forces, calculated in Block 103. Without significant loss of accuracy, the trigonometric functions in Eqs. 36 can be approximated by their Taylor series expansions: that is, $\sin \delta_f = \delta_f$, $\cos \delta_f = 1-\delta_f^2/2$, and $1/\cos \delta_f = 1+\delta_f^2/2$. This completes the calculations performed in Block 104. If the simplified Equations 8 are used, the signals used by this block are lateral acceleration ay and vehicle yaw rate $\Omega$. When the more complete Eqs. 37 are used, additional variables are front and rear steering angles $\delta_f$ and $\delta_r$, and the tire longitudinal forces calculated from the nonlinear tire model in Block 103.

Subsequently, in Block 105, the estimates of tire longitudinal forces are computed from the wheel dynamics. Calculation of the tire longitudinal force from the dynamic equation of wheel rotation was discussed earlier. The forces and moments acting on the wheel are shown in FIG. 3. The balance of moments about the wheel axis of rotation yields Eq. 2, which is repeated below:

$$F_{xje}=[T_{dj}-T_{bj}-f*F_{zj}-I_w*(d\omega_{wj}/dt)]/r_w. \quad (2)$$

All the variables in the above equation are approximately known. The powertrain controller, using the estimate of engine torque, gear ratios, engine speed, and rotary inertia of the powertrain, calculates the driving torque at the wheel, $T_{dj}$. The brake torque $T_{bj}$ applied to the wheel is obtained from the brake controllers 20, 22, 24, 26 using the master cylinder or caliper pressures and other brake system parameters. The arm f of the rolling resistance moment is assumed to be constant, with a typical value of 0.005 m; and the normal tire force F was estimated earlier at Block 102. Since the rolling resisting moment $f*F_z$ is small, it can be assumed constant or even ignored altogether. The wheel parameters, the rotary inertia $I_w$, and the tire radius $r_w$ are also known. The wheel rotary acceleration $d\omega_{wj}/dt$ is obtained by passing the measured wheel rotational speed through a second-order high pass filter (i.e., a differentiator) (of course, wheel linear speed can be used instead and then divided by wheel radius).

Next, the vehicle handling state is determined in Block 106. As explained earlier, the surface coefficients of adhesion can be detected from measured vehicle response only during maneuvers in which at least some of vehicle tires approach the limit of adhesion: that is, some vehicle tires are in the nonlinear range of operation. It is determined in this Block whether the vehicle is in the linear or nonlinear range of handling behavior and whether it is in a quick transient maneuver or in an approximately steady state condition. These determinations are used to decide the speed with which surface coefficients of adhesion can be adjusted in response to the errors in axle lateral forces. For example, when the vehicle 10 is in the linear range of operation the surface coefficients are held at their nominal values (usually 1), because it is impossible to assess the true surface coefficients of adhesion. But if the vehicle 10 is at the limit of adhesion and in a steady state condition, the speed of adaptation can be very high, since under the circumstances surface coefficients can be evaluated as ratios of tire resultant forces in the yaw (horizontal) plane to the tire normal load. Details of adjustment of speed of adaptation are discussed in the next sub-section.

A variable instrumental in determining whether the vehicle 10 is in linear or nonlinear cornering maneuver is the yaw rate error $\Omega_{err}$, which is defined as a difference between the desired yaw rate $\Omega_d$, and a measured yaw rate $\Omega$:

$$\Omega_{err}=\Omega_d-\Omega. \quad (38)$$

The desired yaw rate $\Omega_d$ is supplied by the vehicle stability enhancement system. There are several known methods to determine the desired yaw rate. For example, it can be computed from the linear bicycle vehicle model in the yaw plane and then limited in magnitude to a specified, speed-dependent value, which may be, for example, $g/v_x$. The yaw rate error is passed through a low-pass filter, for example a first order filter with a transfer function $a_f/(s+a_f)$ with an example value of $a_f=30$ rad/s, in order to attenuate noise. This yields the filtered yaw rate error $\Omega_{errf}$. Examples of vehicle stability enhancement systems providing a yaw rate error signal are found in U.S. Pat. No. 5,746,486, issued May 5, 1998, U.S. Pat. Nos. 5,720,533 and 6,035,251.

The vehicle 10 is considered to be in a linear range of handling if the following conditions are simultaneously satisfied:

(1) The magnitude of yaw rate error filtered is smaller than a threshold: $|\Omega_{errf}|<$Yaw_Thresh1; and (2) Either the condition (1) is satisfied for a specified time period $t_{hold}$ or the magnitude $|\Omega_{errf}|$ of yaw rate error filtered, passed through a slow low pass filter (for example a filter with a transfer function 2/[s+2]) is smaller than another threshold Yaw_Thresh2, where $|\Omega_{errf}|_{filt}<$Yaw_Thresh2. Representative values for the thresholds are: Yaw_Thresh1=7 deg/s, Yaw_Thresh2=4 deg/s, and the hold time $t_{hold}$=0.3 s.

The vehicle 10 is considered to be in the nonlinear range of handling behavior if these conditions are not satisfied.

The vehicle 10 is considered to be in the steady state (no quick transient) if the following two conditions are satisfied simultaneously:

1) The product of the measured lateral acceleration and the weighted sum of yaw rate $\Omega$ and the derivative $d\Omega/dt$ of yaw rate is greater than a threshold:

$$a_y*(\Omega+\text{Yaw\_coef}*d\Omega/dt)>\text{AyYRD\_Prod},$$

where Yaw_coef and AyYRD_Prod are constants with example value of 0.5 and 1.0, respectively (assuming that yaw rate is expressed in deg/s, its derivative in deg/s$^2$, and lateral acceleration $a_y$ in m/s$^2$); and 2) Either the product of lateral acceleration ay and desired yaw rate $\Omega_d$ is positive for some specified time; that is:

$$a_y*\Omega_d>\text{AyYR\_Prod or a time period } t_{hold1},$$

or the magnitude of derivative of lateral acceleration is less than a threshold:

$$|da_y/dt|<\text{Ay\_Dot\_Thre}.$$

In the above, AyYR_Prod and Ay_Dot_Thre are small positive constants with the example values of 1 (if $a_y$ is in m/s$^2$ and $\Omega_d$ in deg/s) and 2 m/s$^3$, respectively.

Essentially, conditions (1) and (2) state that, for the vehicle 10 to be in steady state handling condition, the signs of lateral acceleration, yaw ratewith some lead (differential) component, and the desired yaw rate must be the same or that the time derivative of lateral acceleration must be quite small. Since the desired yaw rate remains almost in phase with the steering angle (with just a small delay), the steering angle could be used in the above conditions instead of desired yaw rate. The derivative of measured lateral acceleration is obtained in practice by passing the measured (and filtered) lateral acceleration through a high pass filter, in order to reduce the effect of measurement noise.

Determination of a steady state condition is important in estimating the surface coefficient of adhesion, because in this condition calculations of tire lateral force errors (that is, the difference between the forces estimated from the vehicle dynamics and calculated from the tire model) are more reliable than during quick transients. During quick transients, significant force errors may arise not because of changes in surface conditions but as a result of minute phase differences between the estimated and actual forces.

The determination of the speed of adaptation and the magnitude of corrective terms for longitudinal and lateral forces are performed in Blocks 107 and 108, respectively. These are the coefficients, denoted by $\gamma$ in the prototype parameter adaptation laws given by Eq. 20, which determine the speed of adaptation of surface coefficients of adhesion: the errors (differences between the estimated and calculated tire and axle forces) are multiplied by these coefficients. Since the calculation of estimated tire forces in the longitudinal and lateral directions rely on different measured or estimated variables, the corresponding dead-bands in calculation of errors can also be different in longitudinal and lateral direction (since they are related to sensor errors). It is therefore advantageous to use different coefficients $\gamma$ in each direction; these coefficients will be denoted by $\gamma_x$ and $\gamma_y$.

When tire forces in both the longitudinal and lateral directions are small, the tires remain within the linear range of operation and the differences between the magnitudes of estimated forces and those calculated from the linear and nonlinear tire models are within the error thresholds expected to result from typical sensor errors. Under these circumstances, it is nearly impossible to estimate the surface coefficients and they are set at the default value of 1. These conditions will be called reset conditions. The reset conditions for a given tire are satisfied if the reset conditions in both the lateral and longitudinal directions are met. These conditions are:

(1) In the lateral direction, the vehicle 10 is in the linear range of handling behavior as determined in Block 106.

(2) In the longitudinal direction, (a) the magnitude of the difference between the tire longitudinal force $F_{xlin}$ determined from the linear model and the tire longitudinal force estimated from wheel dynamics is below a threshold (that is, $|F_{xlin}-F_{xe}|<$Fx_Exit_Thre) and (b) the low-pass filtered version of the above magnitude is below another threshold $|F_{xlin}-F_{xe}|_{filt}<$Fx_Exit_Thre1. Here, the filtered version was obtained by passing the signal through a low-pass filer with a transfer function $a_f/(s+a_f)$ with a typical value of $a_f=4$ rad/s. The threshold values depend on the accuracy of estimation of braking and driving torques and are typically in the order 600 N for Fx_Exit_Thre and 400 N for Fx_Exit_Thre1.

In addition, the reset conditions are satisfied for all four tires when the magnitude of resultant vehicle acceleration exceeds a specified threshold value:

$$a_{res}=\sqrt{(a_x^2+a_y^2)}>\text{A\_max},$$

where A_max is a constant equal to the maximum acceleration that the vehicle 10 can sustain on a dry surface with the coefficient of adhesion equal to 1. This condition is based on the premise that the maximum acceleration can be achieved when all wheels 12, 14, 16, 18 are on a dry surface with the coefficient of adhesion of 1.

The coefficient $\gamma_x$, which governs the speed of adaptation in longitudinal direction, assumes one of three values: 0, $\gamma_{xlow}$ and $\gamma_{xhigh}$. The zero value is used when the reset conditions for this wheel as outlined above are satisfied. In this case, the surface estimate is set to 1 and is not adjusted as long as reset conditions are satisfied. The high value $\gamma_{xhigh}$ is used when the following conditions are satisfied:

(1) The longitudinal tire force $F_{xlin}$ calculated from the linear tire model and the longitudinal tire force $F_{xe}$ estimated from the wheel dynamics have the same sign; that is:

$$F_{xlin}*F_{xe} > \text{Fx\_Prod\_Thresh},$$

where Fx_Prod_Thresh is a positive constant. A typical value of Fx_Prod_Thresh is 5000 $N^2$.

(2) The difference in magnitudes between the tire longitudinal force $F_{xlin}$ calculated from the linear tire model and the corresponding force $F_{xe}$ estimated from the wheel dynamics is greater than a threshold:

$$|F_{xlin}| - |F_{xe}| > \text{Fx\_Diff\_Thresh},$$

where Fx_Diff_Thresh is a positive constant. A representative value of Fx_Diff_Thresh is 700 N. If neither the set of conditions required to set the parameter $\gamma_x$ at the high value $\gamma_{xhigh}$ nor the conditions required to set it to zero (reset) are satisfied, the parameter $\gamma_x$ is set to $\gamma_{xlow}$.

Similarly, the coefficient $\gamma_y$, which affects the speed of adaptation of surface coefficients in response to the errors in lateral tire forces, is selected from among three predetermined values: zero, $\gamma_{ylow}$, and $\gamma_{yhigh}$. The coefficient is set to zero when the reset conditions are satisfied. It is set to the high value w when the following three conditions are simultaneously met:

(1) The lateral forces (per axle) $F_{ylin}$ calculated from the linear tire model and $F_{ye}$ estimated from vehicle dynamics have the same signs; that is:

$$F_{ylin}*F_{ye} > \text{Fy\_Prod\_Thresh},$$

where Fy_Prod_Thresh is a positive constant (An example value of Fy_Prod_Thresh is 10,000 $N^2$);

(2) The vehicle 10 is in a steady state condition, as defined in the previous sub-section; and (3) Either (a) the magnitude of yaw rate error $|\Omega_{err}|$ (as defined in the previous sub-section) is above a threshold value $|\Omega_{err}| > \text{Yaw\_Thresh1}$ or (b) the magnitude of the difference between the lateral force per axle $F_{ylin}$ calculated from the linear tire model and the lateral force per axle $F_{ye}$ estimated from the vehicle lateral dynamics is above a threshold $|F_{ylin}-F_{ye}| > \text{Fy\_Diff\_Thresh}$, where Yaw_Thresh and Fy_Diff_Thresh are positive constants. Representative values of Yaw_Thresh1 and Fy_Diff_Thresh are 7 deg/s and 1500 N, respectively.

If neither the reset conditions nor the conditions required to set $\gamma_y$ at the high value $\gamma_{yhigh}$ are satisfied, the low value $\gamma_{ylow}$ is selected. This completes the determination of the speed of adaptation. Although one particular method of adjustment with three discrete values was described here, it is possible to make straightforward modifications. For example, adjustments could be made among more discrete values; or it could be made continuous. In addition, when conditions necessary to achieve high speed of adaptation (but with higher threshold values for the errors Fx_Diff_Thresh and Fy_Diff_Thres) are satisfied, the surface coefficient (for one tire) may be computed as a ratio between the resultant of estimated forces and the corresponding normal force.

In Block 109, the estimates of surface coefficients of adhesion for each wheel 12, 14, 16, 18 are updated by adding an incremental value to those obtained in the previous iteration. The increments are determined as functions of the errors in the tire forces, and other variables. The following modifications are made to the prototype parameter adaptation control law, given by Eq. 20. First, for the parameter $\gamma$, which is used to adjust the speed of adaptation, different values are used for forces in lateral and longitudinal directions, $\gamma_x$ and $\gamma_y$ respectively. Furthermore, these values are adjusted depending on the particular operating conditions of the vehicle 10 and tires 12, 14, 16, 18, as explained earlier. Secondly, the gradients (partial derivatives) of tire forces with respect to the surface coefficients of adhesion $\partial F_{xcalc}/\partial \mu$ and $\partial F_{ycalc}/\partial \mu$ are replaced by the differences between the tire forces computed from the linear tire model and those calculated from the nonlinear tire model, $F_{xlin}-F_{xcalc}$ and $F_{ylin}-F_{ycalc}$, respectively. Thirdly, the surface coefficients for the rear tires 16, 18 are additionally updated using the surface coefficients for corresponding front tires 12, 14 from the time period $\Delta t=(a+b)/v_x$ earlier. This time period corresponds to the time delay with which the rear wheels 16, 18 reach the surface traveled by the front wheels 12, 14. It is assumed that the rear wheels 16, 18 travel over the same path as the front wheels 12, 14 with a speed dependent time delay. This modification of the parameter adaptation law is derived from an observation that the surface changes are often detected first on the front wheels 12, 14, before they can be observed at the rear wheels 16, 18. If the time delay $\Delta t$ corresponds to $\Delta N$ sampling periods, the parameter adaptation control laws are as follows:

$$\mu_1(i+1)=\mu_1(i)+\gamma_x*(F_{x1e}-F_{x1calc})*(F_{x1lin}-F_{x1calc})+\gamma_y*(F_{yfe}-F_{y1calc}-F_{y2calc})*(F_{y1lin}-F_{y1calc}) \quad (39a)$$

$$\mu_2(i+1)=\mu_2(i)+\gamma_x*[(F_{x2e}-F_{x2calc})*(F_{x2lin}-F_{x2calc})+\gamma_y*(F_{yfe}-F_{y1calc}-F_{y2calc})*(F_{y2lin}-F_{y2calc}) \quad (39b)$$

$$\mu_3(i+1)=\mu_3(i)+\gamma_x*[(F_{x3e}-F_{x3calc})*(F_{x3lin}-F_{x3calc})+\gamma_y*(F_{yre}-F_{y3calc}-F_{y4calc})*(F_{y3lin}-F_{y3calc})+\gamma_\mu*[\mu_1(i-\Delta N)-\mu_3(i)] \quad (39c)$$

$$\mu_4(i+1)=\mu_4(i)+\gamma_x*(F_{x4e}-F_{x4calc})*(F_{x4lin}-F_{x4calc})+\gamma_y*(F_{yre}-F_{y3calc}-F_{y4calc})*(F_{y4lin}-F_{y4calc})+\gamma_\mu*[\mu_2(i-\Delta N)-\mu_4(i)] \quad (39d)$$

The coefficient $\gamma_\mu$ is used to adjust the speed of updating the surface estimates for the rear tires 16, 18 based on the surface estimates for the front tires 12, 14. This completes the computation of the updated surface coefficients of adhesion for each wheel.

In Block 110, the lateral velocity $v_y$ of vehicle center of mass is computed using a closed-loop observer. The closed-loop observer is a simple dynamic model describing the vehicle lateral dynamics. A closed-loop observer uses feedback of measured signals in order to reduce the effects of disturbances and mismatches between the model and the vehicle. Any method of estimating the lateral velocity $v_y$ can be used here, although the method described below is preferred. In a simplified form, vehicle lateral dynamics is described by Eqs. 7 reprinted here:

$$M*a_y = F_{yf} + F_{yr} \quad (7a)$$

$$I_{zz}*(d\Omega/dt) = a*F_{yf} - b*F_{yr} \quad (7b)$$

Since the lateral acceleration $a_y$ is given by the following kinematic relationship:

$$a_y = dv_y/dt + v_x*\Omega, \quad (40)$$

Eq. 7a can also be written as:

$$dv_y/dt = -v_x*\Omega + (F_{yf}+F_{yr})/M. \quad (41)$$

If, in the above equation the unknown lateral forces per axle, $F_{yf}$ and $F_{yr}$ are replaced by the calculated values $F_{yfcalc}$ and $F_{yrcalc}$ obtained from the (non-linear) tire model:

$$F_{yfcalc} = F_{y1calc} + F_{y2calc} \quad (42a)$$

$$F_{yrcalc} = F_{y3calc} + F_{y4calc} \quad (42b)$$

then Eq. 41, modified in this way, could serve as an open-loop observer. The estimate $v_{ye}$ of lateral velocity could be obtained, at least in principle, by integrating Eq. 41. However, any errors in calculating the lateral forces, as well as disturbances not included in the model, could result in divergence of the estimated value from the actual lateral velocity. To reduce these adverse effects, feedback terms need to be added to the observer. These feedback terms can be obtained from Eqs. 7 and 40, since these equations can be satisfied exactly if the model were perfect. In reality, there will be small differences between the terms on the left and the right sides of these equations that can serve as corrective terms for the closed-loop observer.

The bank angle of the road has a particularly strong effect on the estimates of lateral velocity from an open-loop observer, because it introduces a systematic error in the lateral acceleration measurement which, when integrated over time, leads to large errors in the estimated lateral velocity. A solution to this problem lies in using the Eq. 7a, which is satisfied on both level and banked roads, because bank angle affects the measured lateral acceleration and tire forces in the same way. Passing the difference between the measured lateral acceleration ay and the estimated acceleration $(F_{yfcalc} + F_{yrcalc})/M$:

$$\Delta a_y = a_y - (F_{yfcalc} + F_{yrcalc})/M \quad (43)$$

through a low-pass filter produces a corrective term that has been found to be very effective in reducing the effect of bank angle of the road. Thus, the observer equation is:

$$dv_{ye}/dt = v_x*\Omega + (F_{yfcalc} + F_{yrcalc})/M + g_1*[d\Omega/dt - (a*F_{yfcalc} - b*F_{yrcalc})] + g_2*(a_y - dv_{ye}/dt - v_x*\Omega) - g_3*\Delta a_y - g_4*\Delta a_{yf} \quad (44)$$

where $\Delta a_{yf}$ is the lateral acceleration error term $\Delta a_y$ passed through a low-pass filter, for example a first order filter with a transfer function $a_f/(s+a_f)$ with a typical value of $a_f = 1$ rad/s. The parameters $g_i$, $i = 1,2,3,4$, are the observer gains, which are carefully tuned to provide good performance and stability of the observer in all operating conditions. Eq. 44 can be rearranged in order to avoid differentiation on the right side of equation. Introducing a variable:

$$q = (1+g_2)*v_{ye} - g_1*\Omega, \quad (45)$$

Eq. 44 may be written in the following form:

$$dq/dt = -(1+g_2)*v_x*\Omega + [(1+g_3)/M - a*g_1/I_{zz}]*F_{yfcalc} + [(1+g_3)/M + b*g_1/I_{zz}]*F_{yrcalc} + (g_2 - g_3)*a_y - g_4*\Delta a_y. \quad (46)$$

By solving the differential Eq. 46 in real time to determine the observer state variable q and then using Eq. 45, the algorithm determines the estimated lateral velocity $v_{ye}$. This estimate is used in the next iteration by Block 103.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A method of determining a coefficient of adhesion between a road surface and each of a plurality of tires disposed on a vehicle, comprising:

providing an estimated coefficient of adhesion for each of the plurality of tires;

determining for each of the plurality of tires a longitudinal adaptation speed as a function of a tire longitudinal force value;

determining for each of the plurality of tires a lateral adaptation speed as a function of a tire lateral force value;

estimating for each of the plurality of tires a coefficient of adhesion adjustment, each being based on the longitudinal adaptation speed and the lateral adaptation speed; and updating for each of the plurality of tires the estimated coefficient of adhesion with the estimated coefficient of adhesion adjustments.

2. The method of claim 1, wherein for each of the plurality of tires the tire longitudinal force value and the tire lateral force value are based on a tire longitudinal slip value, a tire slip angle, a tire normal force value and the estimated coefficient of adhesion.

3. The method of claim 2, wherein determining the tire longitudinal slip value and tire slip angle further comprise:

measuring a vehicle yaw rate;

receiving a wheel speed value for each of the plurality of tires;

determining a front wheel steer angle value;

determining a rear wheel steer angle value;

calculating the tire longitudinal slip value based on each of the wheel speed values and the vehicle yaw rate; and calculating the tire slip angle based on each of each of the wheel speed values and each of the wheel steer angle values and the vehicle yaw rate.

4. The method of claim 2, wherein determining the tire normal force value comprises:

receiving a vehicle lateral acceleration value;

estimating a vehicle longitudinal acceleration value by passing a vehicle reference speed value through a differentiator;

calculating a longitudinal load transfer value based on the vehicle longitudinal acceleration value;

calculating a lateral load transfer value based on the vehicle lateral acceleration value; and summing the longitudinal load transfer value and the lateral load transfer value.

5. The method of claim 1, further comprising determining a vehicle handling state.

6. The method of claim 5, wherein the vehicle handling state is a state selected from the group consisting of a linear state of handling, a nonlinear state of handling, a quick transient state of handling and an approximate steady state of handling.

7. The method of claim 1, wherein the coefficient of adhesion has an initial value of 1.

8. The method of claim 1, wherein the plurality of tires comprises a pair of front tires and a pair of rear tires and the estimated coefficients of adhesion for each of the rear tires is updated using a coefficient of adhesion for a corresponding one of the front tires.

9. A method of determining a coefficient of adhesion between a road surface and a plurality of tires disposed on a vehicle, comprising:

providing an estimated coefficient of adhesion for each of the plurality of tires, the plurality of tires including at least two front tires and at least two rear tires;

determining a tire longitudinal slip value and a tire slip angle for each of the plurality of tires;

determining a tire normal force value for each of the plurality of tires;

determining a first tire longitudinal force value and a tire lateral force value for each of the plurality of tires, the first tire longitudinal force value and the tire lateral force value being based on the tire longitudinal slip value, the tire slip angle, the tire normal force value and the coefficient of adhesion;

determining an axle lateral force value;

determining a second tire longitudinal force value for each of the plurality of tires;

determining a vehicle handling state;

determining a longitudinal adaptation speed;

determining a lateral adaptation speed;

estimating a coefficient of adhesion adjustment for each of the plurality of tires based on the longitudinal adaptation speed and the lateral adaptation speed; and updating the estimated coefficients of adhesion for each of the plurality of tires with the estimated coefficient of adhesion adjustment.

10. A computer usable media for storing a program for determining a coefficient of adhesion between a road surface and a plurality of tires disposed on a vehicle, comprising:

computer readable program code that determines a longitudinal adaptation speed as a function of a tire longitudinal force value for each of the plurality of tires;

computer readable program code that determines a lateral adaptation speed as a function of a tire lateral force value for each of the plurality of tires;

computer readable program code that estimates for each of the plurality of tires a coefficient of adhesion adjustment, each being based on the longitudinal adaptation speed, the lateral adaptation speed and a provided coefficient of adhesion; and computer readable program code that updates for each of the plurality of tires the estimated coefficient of adhesion with the estimated coefficient of adhesion adjustments.

11. The program of claim 10, wherein the tire longitudinal force value and the tire lateral force value are based on a tire longitudinal slip value, a tire slip angle, a tire normal force value and the coefficient of adhesion.

12. The program of claim 11, wherein determining the tire longitudinal slip value and tire slip angle further comprise:

computer readable program code that measures a vehicle yaw rate;

computer readable program code that receives a wheel speed value for each of the plurality of tires;

computer readable program code that determines a front wheel steer angle value;

computer readable program code that determines a rear wheel steer angle value;

computer readable program code that calculates the tire longitudinal slip value based on each of the wheel speed values and the vehicle yaw rate; and computer readable program code that calculates the tire slip angle based on each of the wheel speed values and each of the wheel steer angle values and the vehicle yaw rate.

13. The program of claim 11, wherein the tire normal force determination further comprises:

computer readable program code that receives a vehicle lateral acceleration value;

computer readable program code that estimates a vehicle longitudinal acceleration value by passing a vehicle reference speed value through a differentiator;

computer readable program code that estimates a longitudinal load transfer value based on the vehicle longitudinal acceleration value;

computer readable program code that calculates a lateral load transfer value based on the vehicle lateral acceleration value; and computer readable program code that sums the longitudinal load transfer value and the lateral load transfer value.

14. The program of claim 10, further comprising:

computer readable program code that determines a vehicle handling state.

15. An apparatus for determining a coefficient of adhesion between a road surface and a plurality of tires disposed on a vehicle, comprising:

means for determining a longitudinal adaptation speed as a function of a tire longitudinal force value for each of the plurality of tires;

means for determining a lateral adaptation speed as a function of a tire lateral force value for each of the plurality of tires;

means for estimating for each of the plurality of tires a coefficient of adhesion adjustment, each being based on the longitudinal adaptation speed and the lateral adaptation speed and a provided coefficient of adhesion; and means for updating for each of the plurality of tires the estimated coefficient of adhesion with the estimated coefficient of adhesion adjustments.

16. The apparatus of claim 15, wherein the tire longitudinal force value and the tire lateral force value are based on a tire longitudinal slip value, a tire slip angle, a tire normal force value and the coefficient of adhesion.

17. The apparatus of claim 15, wherein determining the tire longitudinal slip value and tire slip angle further comprise:

means for measuring vehicle yaw rate;

means for receiving a wheel speed value for each of the plurality of tires;

means for receiving a front wheel steer angle value;

means for receiving a rear wheel steer angle value;

means for estimating a vehicle longitudinal speed value;

means for estimating a vehicle lateral speed value;

means for calculating the tire longitudinal slip value based on each of the wheel speed values and the vehicle yaw rate; and means for calculating the tire slip angle based on each of the wheel speed values and each of the wheel steer angle values and the vehicle yaw rate.

18. The apparatus of claim 15, wherein the tire normal force determination further comprises:

means for receiving a vehicle lateral acceleration value;

means for estimating a vehicle longitudinal acceleration value by passing a vehicle reference speed value through a differentiator;

means for calculating a longitudinal load transfer value based on the vehicle longitudinal acceleration value;

means for calculating a lateral load transfer value based on the vehicle lateral acceleration value; and means for summing the longitudinal load transfer value and the lateral load transfer value.

19. The apparatus of claim 15, further comprising means for determining a vehicle handling state.

20. A braking system disposed within an automobile, comprising:
   means for providing an estimated coefficient of adhesion for each of a plurality of tires;
   means for determining a longitudinal adaptation speed as a function of a tire longitudinal force value;
   means for determining a lateral adaptation speed as a function of a tire lateral force value; and
   means for estimating for each of the plurality of tires a coefficient of adhesion adjustment, each being based on the longitudinal adaptation speed and the lateral adaptation speed.

21. The method of claim 20, further comprising means for updating the estimated coefficients of adhesion for each of the plurality of tires with the estimated coefficient of adhesion adjustment.

22. A method of determining a coefficient of adhesion between a road surface and a tire disposed on a vehicle, comprising:
   providing an estimated value of the coefficient of adhesion;
   determining a first value of a force on the tire from a first set of vehicle dynamic parameters requiring no explicit knowledge of the coefficient of adhesion;
   determining a second value of the force on the tire from a second set of vehicle parameters in an analytic tire model including the estimated value of the coefficient of adhesion;
   determining a difference between the first and the second values of the force on the tire;
   updating the estimated value of the coefficient of adhesion in direction to reduce the difference; and
   repeating the previous steps using the updated value of the coefficient of adhesion as the provided value thereof.

23. The method of claim 22 wherein the step of updating the estimated value of the coefficient of adhesion comprises:
   determining a vehicle handling state;
   in response to the vehicle handling state, determining a speed of adaptation; and
   adjusting the estimated value of the coefficient of adhesion in magnitude derived from the speed of adaptation.

24. The method of claim 23 wherein the force on the tire is a lateral force.

25. The method of claim 24 wherein the force on the tire is calculated using dynamic equations of the vehicle in a yaw plane.

26. The method of claim 24 wherein the speed of adaptation is set to a reset value so that no adaptation occurs if the vehicle is determined to be in a linear range of handling behavior based on a function of a magnitude of a yaw rate error between a desired yaw rate and an actual yaw rate of the vehicle.

27. The method of claim 24 wherein the first set of vehicle parameters comprises a vehicle lateral acceleration and a vehicle yaw rate.

28. The method of claim 23 wherein the force on the tire is a longitudinal force.

29. The method of claim 28 wherein the force on the tire is calculated using equations describing rotary dynamics of the tire.

30. The method of claim 28 wherein the speed of adaptation is set to a reset value so that no adaptation occurs when the difference between the first and second values of the force on the tire is lesser in magnitude than a first threshold value and a low pass filtered difference between the first and second values of the force on the tire is lesser in magnitude than a second threshold value.

31. The method of claim 28 wherein the first set of vehicle parameters comprises a wheel speed, a driving torque, a braking torque and a rolling resistance moment.

32. The method of claim 23 wherein the speed of adaptation is set to a reset value so that no adaptation occurs when a longitudinal acceleration of the vehicle exceeds a reference vehicle acceleration threshold.

33. The method of claim 22 wherein the second set of vehicle parameters comprises a tire longitudinal slip value, a tire slip angle and a tire normal force value as well as the estimated value of the coefficient of adhesion.

34. A method of determining coefficients of adhesion between a road surface and a set of a front tire and a rear tire disposed on a vehicle, comprising:
   providing an estimated value of the coefficient of adhesion for the front tire;
   determining a first value of a force on the front tire from a first set of vehicle dynamic parameters requiring no explicit knowledge of the coefficient of adhesion;
   determining a second value of the force on the front tire from a second set of vehicle parameters in an analytic tire model including the estimated value of the coefficient of adhesion;
   determining a difference between the first and the second values of the force on the front tire;
   updating the estimated value of the coefficient of adhesion of the front tire in direction to reduce the difference and storing the resulting updated estimated value;
   repeating the previous steps using the updated value of the coefficient of adhesion of the front tire as the provided value thereof; and
   repeatedly deriving the coefficient of friction of the rear tire from one of the stored updated estimated values of the coefficient of friction for the front tire determined at an earlier time determined responsive to vehicle speed.

35. The method of claim 34 wherein the earlier time is earlier by a time duration approximating the time required for the rear tire to travel the distance between the front and rear tires at the vehicle speed.

\* \* \* \* \*